(12) United States Patent
Izuoka et al.

(10) Patent No.: US 11,252,322 B2
(45) Date of Patent: Feb. 15, 2022

(54) ELECTRONIC DEVICE CAPABLE OF PERFORMING CONTROL IN ACCORDANCE WITH A MOVEMENT OPERATION OF AN OPERATING BODY AND CONTROL METHOD THEREOF

(71) Applicant: CANON KABUSHIKI KAISHA, Tokyo (JP)

(72) Inventors: Hirokazu Izuoka, Kawasaki (JP); Tatsuya Ehira, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/858,402

(22) Filed: Apr. 24, 2020

(65) Prior Publication Data

US 2020/0344408 A1    Oct. 29, 2020

(30) Foreign Application Priority Data

Apr. 26, 2019   (JP) .............................. JP2019-085716
Apr. 26, 2019   (JP) .............................. JP2019-085967

(51) Int. Cl.
*H04N 5/232*    (2006.01)
*G03B 3/00*    (2021.01)

(52) U.S. Cl.
CPC ..... *H04N 5/23216* (2013.01); *H04N 5/23212* (2013.01); *H04N 5/232939* (2018.08)

(58) Field of Classification Search
CPC ........... H04N 5/35518; H04N 5/35563; H04N 5/355; H04N 5/363; H04N 5/378; H04N 5/2253; H04N 5/2355; H04N 5/3355; H04N 5/23212; H04N 5/232127;
(Continued)

(56) References Cited

U.S. PATENT DOCUMENTS

| | | | |
|---|---|---|---|
| 8,102,433 B2* | 1/2012 | Fujii | H04N 5/23212 348/217.1 |
| 2006/0127080 A1* | 6/2006 | Mori | H04N 5/23212 396/121 |
| 2017/0195553 A1* | 7/2017 | Shiozaki | G06F 3/0488 |

(Continued)

FOREIGN PATENT DOCUMENTS

| | | | |
|---|---|---|---|
| JP | 2827612 B2 | 11/1998 | |
| JP | 2018-037893 A | 3/2018 | |
| WO | WO2018021165 | * | 2/2018 |

*Primary Examiner* — Albert H Cutler
(74) *Attorney, Agent, or Firm* — Cowan, Liebowitz & Latman, P.C.

(57) ABSTRACT

An electronic device according to the present invention, includes at least one memory and at least one processor which function as: a detecting unit configured to detect a movement operation involving a movement of an operating body; and a control unit configured to perform control such that in a first case where a number of candidates as a selected position for a predetermined function is a first number, the selected position for the predetermined function is moved in accordance with an operation amount of the movement operation exceeding a first threshold, and in a second case where the number of candidates as the selected position for the predetermined function is a second number, the selected position for the predetermined function is moved in accordance with the movement operation even when the operation amount of the movement operation does not exceed the first threshold.

14 Claims, 11 Drawing Sheets

(58) Field of Classification Search
CPC ....... H04N 5/23293–232945; H01L 27/14665;
H01L 27/14643; H01L 29/42372
USPC .............................. 348/333.01–333.12, 346
See application file for complete search history.

(56) References Cited

U.S. PATENT DOCUMENTS

| | | | |
|---|---|---|---|
| 2018/0059927 A1* | 3/2018 | Shigemitsu | ........... G06F 3/0485 |
| 2019/0158761 A1* | 5/2019 | Sasai | ................ H04N 5/232945 |
| 2019/0268545 A1* | 8/2019 | Inomata | ........... H04N 5/232123 |

* cited by examiner

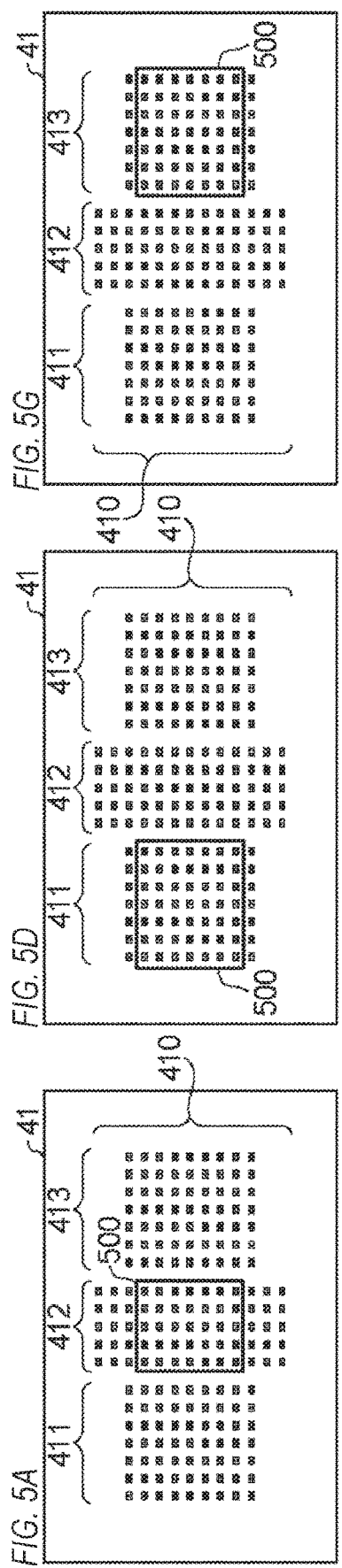

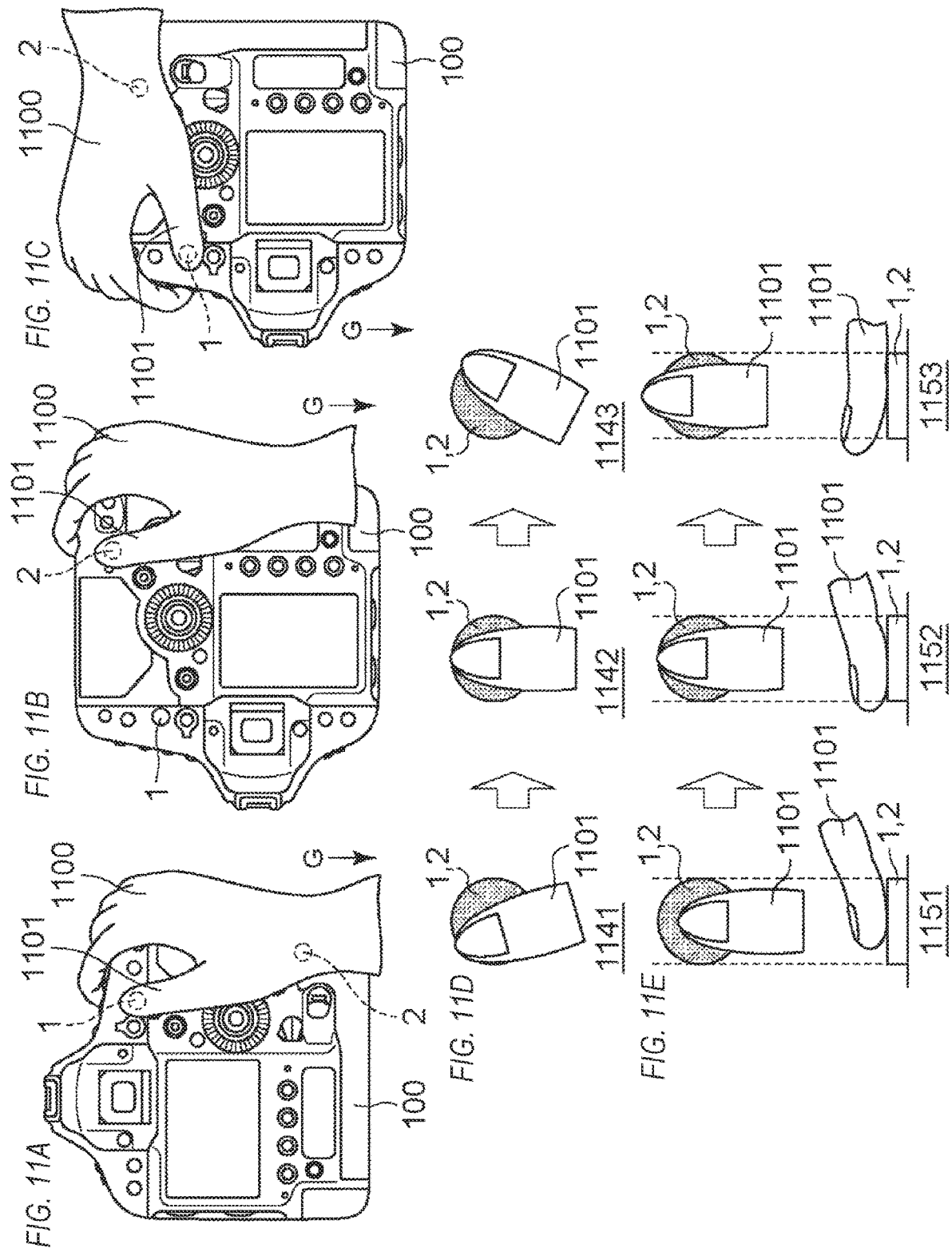

ELECTRONIC DEVICE CAPABLE OF PERFORMING CONTROL IN ACCORDANCE WITH A MOVEMENT OPERATION OF AN OPERATING BODY AND CONTROL METHOD THEREOF

BACKGROUND OF THE INVENTION

Field of the Invention

The present invention relates to an electronic device and, particularly, to a method of control in accordance with a movement operation that is accompanied by a movement of an operating body.

Description of the Related Art

There are electronic devices mounted with a touch operation member that detects a contact by an operating body such as a finger. Such an electronic device controls a selection or a movement of an object in accordance with a touch operation with respect to the touch operation member. Japanese Patent No. 2827612 discloses a technique for starting scroll display when there is a movement operation of a touch position of which an operation amount (a movement distance by a finger on a touch operation member) is equal to or larger than a threshold. Japanese Patent Application Laid-open No. 2018-037893 proposes moving, in accordance with a touch-move that involves touching a touch panel on a camera rear surface and then moving, a position index displayed in a finder from a present position in accordance with a direction and a movement amount of the touch-move.

Unless a selected position smoothly tracks a movement operation of an operating body (such as a finger), a user may sense that operability is poor. Meanwhile, when a selected position is changed by a slight movement operation of the operating body, fine operations may be required in order to select an intended selected position. Therefore, depending on an object that is selectable as a selected position, there is a possibility that the object may give the user a sense of poor operability. However, in Japanese Patent No. 2827612 and Japanese Patent Application Laid-open No. 2018-037893, no consideration is given to movement responsiveness with good operability in accordance with an object that is selectable as a selected position.

In addition, depending on a preference or a situation of the user, there may be cases where the user desires to slowly move a finger to accurately move a selected position a little bit at a time, cases where the user desires to quickly move the finger to quickly move the selected position, and the like. When the user desires to slowly move a finger to accurately move a selected position a little bit at a time, if a responsiveness of a movement of a selected position with respect to a movement of the finger is high, a short movement distance of the finger ends up causing a movement of the selected position and makes it difficult for the user to make fine adjustments as exactly intended. On the other hand, when the user desires to quickly move the finger to quickly move the selected position, low responsiveness of a movement of a selected position with respect to a movement of the finger becomes a hassle. However, in the techniques disclosed in Japanese Patent No. 2827612 and Japanese Patent Application Laid-open No. 2018-037893, no consideration is given to satisfying requirements of the two cases described above and, at the same time, no consideration is given to a suitable responsiveness for each movement speed of a finger until a start of movement of a selected position in accordance with the movement of the finger.

SUMMARY OF THE INVENTION

A first aspect of the present invention provides an electronic device that enables a movement operation in accordance with an object to be selected as a selected position and with a better sense of operation to be performed and to a control method of the electronic device. A second aspect of the present invention provides an electronic device capable of suitably performing, in accordance with an operation speed of a movement operation, control in accordance with the movement operation and to a control method of the electronic device.

An electronic device according to the present invention, includes at least one memory and at least one processor which function as: a detecting unit configured to detect a movement operation involving a movement of an operating body; and a control unit configured to perform control such that in a first case where a number of candidates as a selected position for a predetermined function is a first number, the selected position for the predetermined function is moved in accordance with an operation amount of the movement operation exceeding a first threshold, and in a second case where the number of candidates as the selected position for the predetermined function is a second number, the selected position for the predetermined function is moved in accordance with the movement operation even when the operation amount of the movement operation does not exceed the first threshold.

Further features of the present invention will become apparent from the following description of exemplary embodiments with reference to the attached drawings.

BRIEF DESCRIPTION OF THE DRAWINGS

FIGS. 5A to 5I are diagrams showing ranging zones according to the present embodiment;

FIGS. 11A to 11E are diagrams showing slide operations of an AF-ON button according to the present embodiment.

DESCRIPTION OF THE EMBODIMENTS

Figure 1A:
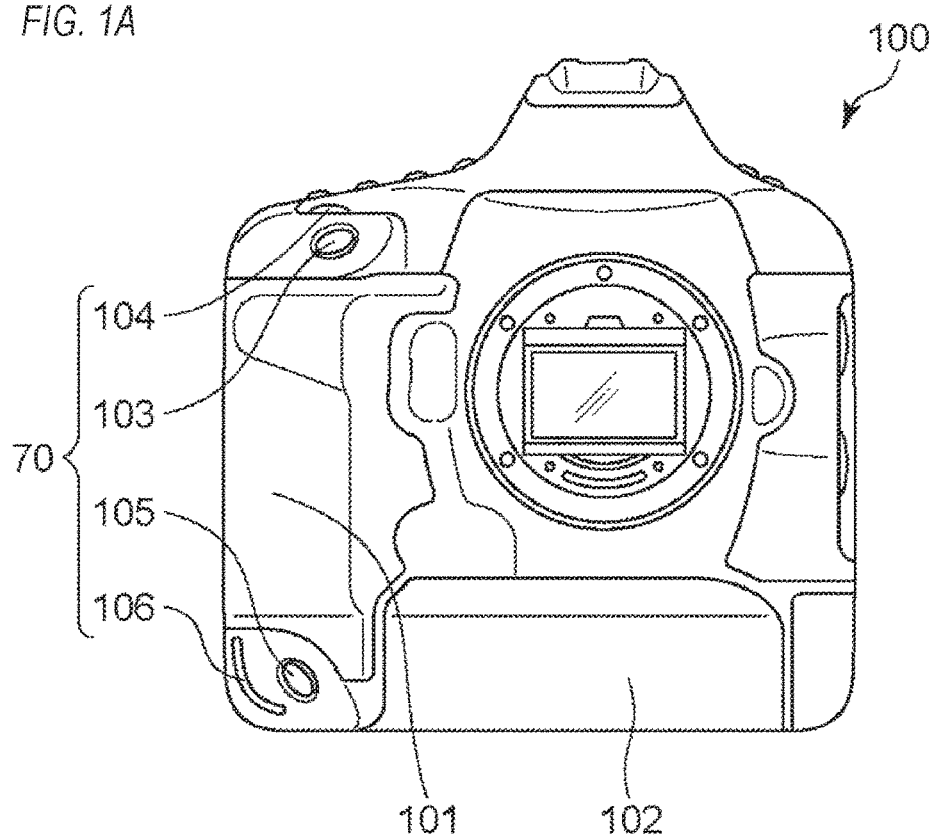
FIGS. 1A and 1B are external views of a camera according to an embodiment.
Figure 1B:
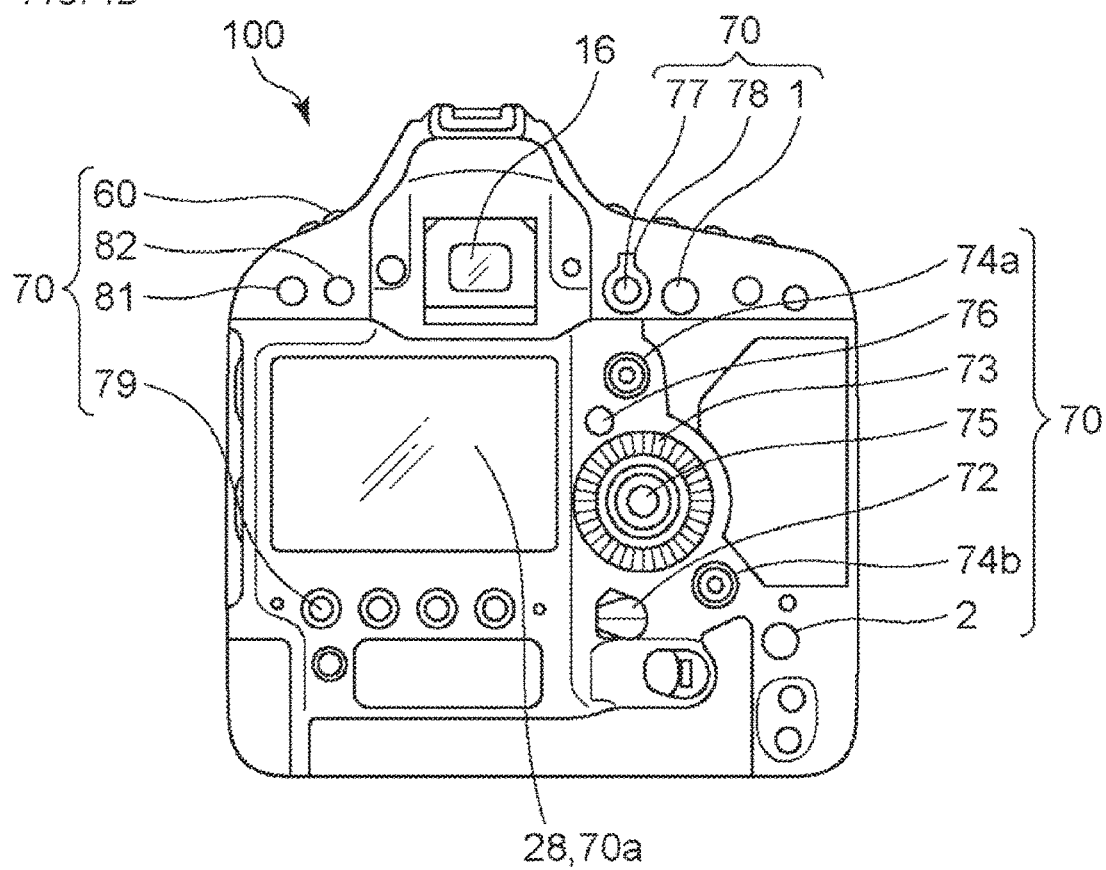

Hereinafter, a preferred embodiment of the present invention will be described in detail with reference to the accompanying drawings. FIGS. 1A and 1B are external views of a main body of a single-lens reflex camera (hereinafter, referred to as a camera) 100 as an example of an imaging apparatus (which is an electronic device) to which the present invention is applicable. Specifically, FIG. 1A is a diagram in which the camera 100 is viewed from a first surface (a front surface) side and which shows a state where a photographing lens unit has been removed. FIG. 1B is a diagram in which the camera 100 is viewed from a second surface (a rear surface). The first surface is a camera front surface which is a surface on an object side (a surface on a side of an image sensing direction). The second surface is a rear surface of the camera which is a surface on a rear side (opposite side) of the first surface and a surface on a side of a photographer who looks into a finder 16.

As shown in FIG. 1A, the camera 100 is provided with a first grip portion 101 that protrudes forward so that a user of the camera 100 can grasp and handle the camera 100 in a stable manner when performing photography while laterally holding the camera 100. In addition, the camera 100 is provided with a second grip portion 102 that protrudes forward so that the user of the camera 100 can grasp and handle the camera 100 in a stable manner when performing photography while vertically holding the camera 100. The first grip portion 101 is parallel to a first side (a side on a left side among two vertical sides to the left and right in FIG. 1A) of the front surface of the camera 100, and the second grip portion 102 is parallel to a second side (a side on a lower side among two lateral sides at the top and bottom in FIG. 1A) which is adjacent to the first side of the front surface. Shutter buttons 103 and 105 are operating members for issuing photography instructions. Main electronic dials 104 and 106 are rotating operating members and, by turning the main electronic dials 104 and 106, setting values such as a shutter speed and an aperture can be changed. The shutter buttons 103 and 105 and the main electronic dials 104 and 106 are included in an operating unit 70. The shutter button 103 and the main electronic dial 104 can be mainly used for laterally-held photography and the shutter button 105 and the main electronic dial 106 can be mainly used for vertically-held photography.

In FIG. 1B, a display unit 28 displays images and various types of information. The display unit 28 is provided so as to be superimposed on, or integrated with, a touch panel 70*a* that is capable of accepting a touch operation (capable of touch detection). AF-ON buttons 1 and 2 are operating members for setting a focal adjustment position or starting AF and are included in the operating unit 70. In the present embodiment, the AF-ON buttons 1 and 2 are touch operation members (in the present embodiment, infrared sensors) capable of accepting a touch operation and a depressing operation. Such an operating member adopting an optical system will be referred to as an optical tracking pointer (OTP). While laterally holding the camera 100 (in a state where the camera 100 is held at a lateral position) and looking into the finder 16, the user can perform a touch operation or a slide operation in any two-dimensional direction with respect to the AF-ON button 1 using the thumb of the right hand that is gripping the first grip portion 101. In addition, while vertically holding the camera 100 and looking into the finder 16, the user can perform a touch operation or a slide operation in any two-dimensional direction with respect to the AF-ON button 2 using the thumb of the right hand that is gripping the second grip portion 102. Vertically holding the camera 100 refers to a state where the camera 100 is held at a vertical position that differs from the lateral position by 90 degrees. With a slide operation with respect to the AF-ON button 1 or the AF-ON button 2, the user operating the camera 100 can move a ranging point frame (a position of an AF frame used for AF, a focal adjustment position, a focus detection position) displayed on the display unit 28. In addition, with a depressing operation with respect to the AF-ON button 1 or the AF-ON button 2, the user can immediately start AF on the basis of the position of the ranging point frame. The AF-ON button 1 can be mainly used for laterally-held photography and the AF-ON button 2 can be mainly used for vertically-held photography.

An arrangement of the AF-ON buttons 1 and 2 will be described. As shown in FIG. 1B, the AF-ON buttons 1 and 2 are disposed on a rear surface of the camera 100. In addition, the AF-ON button 2 is disposed at a position that is closer to a vertex formed by a side (the first side) parallel to the first grip portion 101 and a side (the second side) parallel to the second grip portion 102 than to other vertices among the rear surface of the camera 100. Furthermore, the AF-ON button 2 is disposed at a position that is closer to the vertex formed by the side parallel to the first grip portion 101 and the side parallel to the second grip portion 102 than to the AF-ON button 1. The side (the first side) parallel to the first grip portion 101 among the rear surface of the camera 100 is a side on a right side among two vertical sides to the left and right in FIG. 1B. The side (the second side) parallel to the second grip portion 102 among the rear surface of the camera 100 is a side on a lower side among two lateral sides at the top and the bottom in FIG. 1B. In this case, when the rear surface of the camera 100 is considered a polygon, the vertex described above is a vertex of the polygon (a virtual vertex). If the rear surface of the camera 100 is a perfect polygon, the vertex described above may be a vertex of the polygon (an actual vertex of the camera 100). The first side is a side (a vertical side) on the right side in a left-right direction in FIG. 1B, the second side is a side (a lateral side) on the lower side in an up-down direction in FIG. 1B, and the vertex described above which is formed by the first side and the second side is a lower right vertex in FIG. 1B. Furthermore, the AF-ON button 2 is disposed at a position that is closer to an end (a lower end) on an opposite side than to an end (in other words, an upper end) on a side where the AF-ON button 1 is present among the side (the first side) parallel to the first grip portion 101. In addition, the shutter button 103 described earlier is disposed at a position where the shutter button 103 can be operated (can be depressed) by the index finger of the right hand gripping the first grip portion 101, and the shutter button 105 described earlier is disposed at a position where the shutter button 105 can be operated by the index finger of the right hand gripping the second grip portion 102. Furthermore, the AF-ON button 1 is disposed at a position that is closer to the shutter button 103 than the AF-ON button 2 is, and the AF-ON button 2 is disposed at a position that is closer to the shutter button 105 than the AF-ON button 1 is.

It should be noted that the AF-ON buttons 1 and 2 are operating members that differ from the touch panel 70*a* and are not equipped with a display function. In addition, while an example in which an indicator (an AF frame) which indicates a ranging position selected by an operation with respect to the AF-ON buttons 1 and 2 is to be moved will be described below, a function that is executed in response to an operation with respect to the AF-ON buttons 1 and 2 is not particularly limited. For example, the indicator to be moved by a slide operation with respect to the AF-ON buttons 1 and 2 may be any indicator as long as the indicator can be displayed on the display unit 28 and can be moved. For example, the indicator may be a pointing cursor such as a mouse cursor or a cursor that indicates a selected option among a plurality of options (such as a plurality of items displayed on a menu screen). Different indicators may be moved by a slide operation with respect to the AF-ON button 1 and a slide operation with respect to the AF-ON button 2. Functions to be executed by a depressing operation with respect to the AF-ON buttons 1 and 2 may be other functions related to functions to be executed by a slide operation with respect to the AF-ON buttons 1 and 2.

A mode changeover switch 60 is an operating member for switching between various modes. A power supply switch 72 is an operating member for switching a power supply of the camera 100 on and off. A sub electronic dial 73 is a rotating operating member for moving a selection frame, scrolling through images, and the like. 8-way keys 74a and 74b are, respectively, operating members which can be detruded in upward, downward, leftward, rightward, upward left, downward left, upward right, and downward right directions and which enable processing in accordance with a direction in which the 8-way keys 74a and 74b are detruded to be performed. The 8-way key 74a can be mainly used for laterally-held photography and the 8-way key 74b can be mainly used for vertically-held photography. A SET button 75 is an operating member which is mainly used to determine a selected item and the like. A still image/moving image changeover switch 77 is an operating member for switching between a still image photography mode and a moving image photography mode. An LV button 78 is an operating member for switching a live view (hereinafter, an LV) on and off. When LV is switched on, an LV mode is entered in which a mirror 12 (to be described later) moves (mirror-up) to a retracted position where the mirror 12 retracts from an optical axis, object light is guided to an imaging unit 22 (to be described later), and sensing of an LV image is performed. In the LV mode, an object image can be confirmed by an LV image. When LV is switched off, an OVF mode is entered in which the mirror 12 moves (mirror-down) onto the optical axis and the object light is reflected, the object light is guided to the finder 16, and an optical image of the object (an optical object image) becomes visible from the finder 16. A playback button 79 is an operating member for switching between a photography mode (a photography screen) and a playback mode (a playback screen). By depressing the playback button 79 in the photography mode, a transition can be made to the playback mode and a latest image among images recorded in a recording medium 200 (to be described later with reference to FIG. 2) can be displayed on the display unit 28. A Q button 76 is an operating member for configuring a quick setting and, by depressing the Q button 76 on the photography screen, setting items having been displayed as a list of setting values becomes selectable and, by selecting the setting items, a transition can be made to setting screens of the respective setting items. The mode changeover switch 60, the power supply switch 72, the sub electronic dial 73, the 8-way keys 74a and 74b, the SET button 75, the Q button 76, the still image/moving image changeover switch 77, the LV button 78, and the playback button 79 are included in the operating unit 70. A menu button 81 is an operating member which is included in the operating unit 70 and which is used to configure various settings of the camera 100. When the menu button 81 is pushed, a menu screen enabling various settings to be configured is displayed on the display unit 28. The user can intuitively configure various settings using the menu screen displayed on the display unit 28 together with the sub electronic dial 73, the 8-way keys 74a and 74b, the SET button 75, and the main electronic dials 104 and 106. The finder 16 is a look-in (eyepiece-type) finder for checking a focus and a composition of an optical image of an object obtained through a lens unit. An INFO button 82 is included in the operating unit 70 and is capable of displaying various types of information of the camera 100 on the display unit 28.

Figure 2:
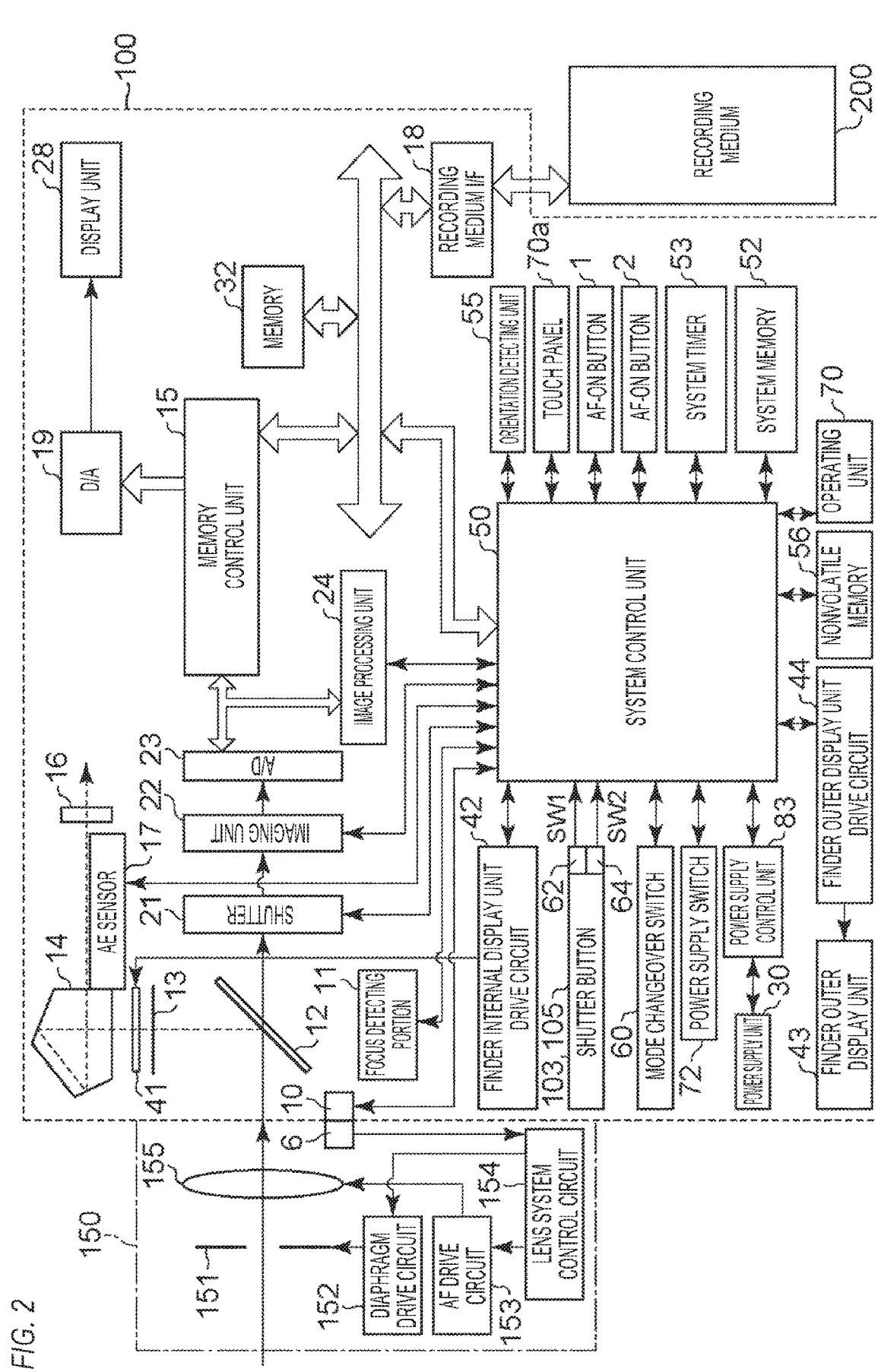
FIG. 2 is a block diagram showing a configuration example of a camera according to the present embodiment.

FIG. 2 is a block diagram showing a configuration example of the camera 100.

A lens unit 150 is a lens unit mounted with a replaceable photographing lens. While a lens 155 is usually configured by a plurality of lenses such as a focusing lens group or a zoom lens group, in FIG. 2, the lens 155 is shown simplified with only one lens. A communication terminal 6 is a communication terminal used by the lens unit 150 to communicate with the camera 100, and the communication terminal 10 is a communication terminal used by the camera 100 to communicate with the lens unit 150. The lens unit 150 communicates with a system control unit 50 via the communication terminals 6 and 10. Furthermore, the lens unit 150 performs focusing by using an internal lens system control circuit 154 to control a diaphragm 151 via a diaphragm drive circuit 152 and displace a position of the lens 155 via an AF drive circuit 153. The lens unit 150 is mounted to a main body side that includes the display unit 28 via a mounting portion that enables the lens unit 150 to be mounted. As the lens unit 150, lens units of various types such as a prime lens or a zoom lens can be mounted.

An AE sensor 17 measures brightness of the object (object light) of which an image is formed on a focusing screen 13 through the lens unit 150 and a quick return mirror 12.

A focus detecting unit 11 is a phase difference detection system AF sensor which senses an image (object light) incident via the quick return mirror 12 and which outputs defocus amount information to the system control unit 50. The system control unit 50 controls the lens unit 150 on the basis of the defocus amount information to perform phase difference AF. A method of AF is not limited to phase difference AF and may instead be contrast AF. In addition, phase difference AF may be performed on the basis of a defocus amount detected on an image sensing surface of the imaging unit 22 (image sensing surface phase difference AF) instead of using the focus detecting unit 11.

The quick return mirror 12 (hereinafter, the mirror 12) is raised and lowered by an actuator (not illustrated) under instructions from the system control unit 50 during exposure, live view photography, and moving image photography. The mirror 12 is a mirror for switching a luminous flux incident from the lens 155 between a side of the finder 16 and a side of the imaging unit 22. While the mirror 12 is normally disposed so as to guide (reflect) the luminous flux to the finder 16 (mirror down), when photography and live view display are performed, the mirror 12 is flipped upward so as to guide the luminous flux to the imaging unit 22 and is retracted from inside the luminous flux (mirror up). In addition, the mirror 12 is configured as a half mirror so that light can be partially transmitted through a central portion thereof, and the mirror 12 causes a part of the luminous flux to be transmitted and incident to the focus detecting unit 11 for performing focus detection.

By observing an image formed on the focusing screen 13 via a pentaprism 14 and the finder 16, the user can check a focal state and a composition of an optical image of an object obtained through the lens unit 150.

A focal plane shutter 21 (a shutter 21) is for controlling an exposure time of the imaging unit 22 under the control of the system control unit 50.

The imaging unit 22 is an image sensing element (an image sensor) constituted by a device such as a CCD or a CMOS which converts an optical image into an electrical signal. An A/D converter 23 is used to convert an analog signal output from the imaging unit 22 into a digital signal.

An image processing unit 24 performs predetermined processing (pixel interpolation, resizing processing such as reduction, and color conversion processing) with respect to data from the A/D converter 23 or data from a memory control unit 15. In addition, the image processing unit 24 performs predetermined computing processing using image data of a captured image, and the system control unit 50 performs exposure control and ranging control based on a computation result obtained by the image processing unit 24. Accordingly, automatic focusing (AF) processing, automatic exposure (AE) processing, and preliminary light emission before flash (EF) processing in a through-the-lens (TTL) system are performed. The image processing unit 24 further performs predetermined computing processing using image data of a captured image and performs automatic white balance (AWB) processing in the TTL system based on an obtained computation result.

A memory 32 stores image data obtained by the imaging unit 22 and converted into digital data by the A/D converter 23 and image data to be displayed on the display unit 28. The memory 32 has sufficient storage capacity for storing a predetermined number of still images and a predetermined time's worth of moving images and audio. The memory 32 may be an attachable/detachable recording medium such as a memory card or may be an internal memory.

The display unit 28 is a rear monitor for displaying images and is provided on the rear surface of the camera 100 as shown in FIG. 1B. A D/A converter 19 converts data for image display stored in the memory 32 into an analog signal and supplies the analog signal to the display unit 28. The display unit 28 may be a liquid crystal system display or a display adopting other systems such as organic EL as long as the display displays images.

A finder internal display unit 41 displays, via a finder internal display unit drive circuit 42, a frame (an AF frame) indicating a ranging point on which automatic focusing is currently being performed, icons representing a setting state of the camera, and the like. Various setting values of the camera 100 including a shutter speed and an aperture are displayed on a finder outer display unit 43 via a finder outer display unit drive circuit 44.

An orientation detecting unit 55 is a sensor for detecting an orientation due to an angle of the camera 100. Based on an orientation detected by the orientation detecting unit 55, a determination can be made as to whether an image photographed by the imaging unit 22 is an image photographed while holding the digital camera 100 laterally or an image photographed while holding the digital camera 100 vertically. The system control unit 50 can add orientation information in accordance with the orientation detected by the orientation detecting unit 55 to an image file of the image sensed by the imaging unit 22, record a rotated version of the image, and the like. An acceleration sensor, a gyro sensor, or the like can be used as the orientation detecting unit 55. A motion (panned, tilted, uplifted, whether stationary or not, and the like) of the camera 100 can also be detected using the acceleration sensor or the gyro sensor that constitutes the orientation detecting unit 55.

A nonvolatile memory 56 is a memory that is electrically erasable and recordable by the system control unit 50 and, for example, an EEPROM is used. Constants, a program, and the like for operations of the system control unit 50 are stored in the nonvolatile memory 56. In this case, the program refers to a program for executing the various flow charts described later in the present embodiment.

The system control unit 50 has at least one built-in processor (including circuits) and controls the entire camera 100. The system control unit 50 realizes the respective processing of the present embodiment (to be described later) by executing the program recorded in the nonvolatile memory 56 described earlier. Constants and variables for the operations of the system control unit 50, the program read from the nonvolatile memory 56, and the like are deployed onto a system memory 52. In addition, the system control unit 50 also performs display control by controlling the memory 32, the D/A converter 19, the display unit 28, and the like.

A system timer 53 is a time-measuring unit for measuring time used in various controls and for measuring time according to an internal clock. The mode changeover switch 60 switches an operating mode of the system control unit 50 to any of a still image photography mode, a moving image photography mode, and the like. The still image photography mode includes a P mode (program AE) and an M mode (manual). Alternatively, after temporarily switching to a menu screen using the mode changeover switch 60, another operating member may be used to switch to any of the modes included in the menu screen. In a similar manner, the moving image photography mode may also include a plurality of modes. In the M mode, the user can set an aperture value, a shutter speed, and ISO sensitivity and can perform photography at a desired exposure.

A first shutter switch 62 is switched on during an operation of the shutter buttons 103 and 105 provided on the camera 100 by a so-called half-press (a photography preparation instruction) and generates a first shutter switch signal SW L. In accordance with the first shutter switch signal SW1, the system control unit 50 starts operations such as automatic focusing (AF) processing, automatic exposure (AE) processing, automatic white balance (AWB) processing, and preliminary light emission before flash (EF) processing. In addition, the system control unit 50 also performs photometry using the AE sensor 17.

A second shutter switch 64 is turned on upon completion of an operation of the shutter buttons 103 and 105 by a so-called full-press (a photography instruction) and generates a second shutter switch signal SW2. In accordance with the second shutter switch signal SW2, the system control unit 50 starts a series of operations of photography processing from reading a signal from the imaging unit 22 to recording an image on the recording medium 200 as an image file.

A power supply control unit 83 is constituted by a battery detection circuit, a DC-DC converter, a switching circuit for switching between blocks to be energized, and the like, and detects whether or not a battery is mounted, a type of the battery, and a remaining battery level. In addition, the power supply control unit 83 controls the DC-DC converter on the basis of the detection results and an instruction from the system control unit 50 and supplies respective units including the recording medium 200 with necessary voltage for a necessary period of time. The power supply switch 72 is a switch for switching the power supply of the camera 100 on and off.

A power supply unit 30 is constituted by a primary battery such as an alkaline battery or a lithium battery, a secondary battery such as a NiCd battery, a NiMH battery, or a Li battery, an AC adapter, or the like. A recording medium I/F 18 is an interface with the recording medium 200 that is a memory card, a hard disk, or the like. The recording medium 200 is a recording medium such as a memory card for recording photographed images and is constituted by a semiconductor memory, a magnetic disk, or the like.

As described above, the camera 100 has the touch panel 70a which is capable of detecting a contact made with respect to the display unit 28 (the touch panel 70a) as one operating unit 70. The touch panel 70a and the display unit 28 can be integrally constructed. For example, the touch panel 70a is configured such that transmittance of light does not obstruct display by the display unit 28 and is mounted to an upper layer of a display surface of the display unit 28. Subsequently, input coordinates on the touch panel 70a and display coordinates on the display unit 28 are associated with each other. Accordingly, a graphical user interface (GUI) can be configured which enables the user to feel as if a screen displayed on the display unit 28 can be directly operated. The system control unit 50 is capable of detecting the following touch operations with respect to the touch panel 70a or the following states of the touch panel 70a.

A new touch on the touch panel 70a by a finger or a stylus previously not in touch with the touch panel 70a. In other words, a start of a touch (hereinafter referred to as a touch-down).

A state where the touch panel 70a is being touched by a finger or a stylus (hereinafter referred to as a touch-on).

A state where a finger or a stylus is moving while in touch with the touch panel 70a (hereinafter referred to as a touch-move).

A state where a finger or a stylus previously in touch with the touch panel 70a separates from the touch panel 70a. In other words, an end of a touch (hereinafter referred to as a touch-up).

A state where nothing is touching the touch panel 70a (hereinafter referred to as a touch-off).

When a touch-down is detected, a touch-on is simultaneously detected. Normally, after a touch-down, a touch-on is continuously detected unless a touch-up is detected. A detection of a touch-move is also a state where a touch-on is detected. Even when a touch-on is detected, a touch-move is not detected unless a touch position moves. A touch-off occurs after a touch-up is detected for all of the fingers or a stylus previously in touch.

The system control unit 50 is notified of the operation and states described above as well as a position coordinate where a finger or a stylus touches the touch panel 70a through an internal bus and, based on the notified information, the system control unit 50 determines what kind of an operation has been performed on the touch panel 70a. With respect to a touch-move, a movement direction of a finger or a stylus moving on the touch panel 70a can be determined for each of a vertical component and a horizontal component on the touch panel 70a on the basis of a change in the position coordinate. In addition, when a touch-up is performed after a touch-move by a certain distance from a touch-down on the touch panel 70a, it is assumed that a stroke has been drawn. An operation that involves drawing a quick stroke is referred to as a flick. A flick is an operation involving quickly moving a finger on the touch panel 70a over a certain distance while keeping the finger in touch with the touch panel 70a and then releasing the finger or, in other words, an operation in which a finger quickly traces the touch panel 70a as though flicking on the touch panel 70a. A determination that a flick has been performed can be made when a detection of a touch-move of a predetermined distance or more at a predetermined speed or more is followed by a detection of a touch-up. In addition, it is assumed that a determination that a drag has been performed is made when a touch-move of the predetermined distance or more at a speed below the predetermined speed is detected. As the touch panel 70a, a touch panel adopting any of various systems including a resistive film system, a capacitance system, a surface acoustic wave system, an infrared system, an electromagnetic induction system, an image recognition system, and an optical sensor system may be used. Any of a system in which a touch is detected when contact is made with the touch panel and a system in which a touch is detected when a finger or a stylus approaches the touch panel may be adopted.

The system control unit 50 is capable of detecting a touch operation or a depressing operation with respect to the AF-ON buttons 1 and 2 on the basis of a notification (output information) from the AF-ON buttons 1 and 2. On the basis of output information of the AF-ON buttons 1 and 2, the system control unit 50 calculates a direction of movement (hereinafter, referred to as a movement direction) of a finger or the like on the AF-ON buttons 1 and 2 in eight directions including upward, downward, leftward, rightward, upward left, downward left, upward right, and downward right directions. In addition, on the basis of output information of the AF-ON buttons 1 and 2, the system control unit 50 calculates an amount of movement (hereinafter, referred to as a movement amount (x,y)) of a finger or the like on the AF-ON buttons 1 and 2 in a two-dimensional direction constituted by an x-axis direction and a y-axis direction. Furthermore, the system control unit 50 is capable of detecting the following operations on the AF-ON buttons 1 and 2 or the following states of the AF-ON buttons 1 and 2. With respect to each of the AF-ON button 1 and the AF-ON button 2, the system control unit 50 individually calculates a movement direction and a movement amount (x,y) or detects the following operations or states.

A new touch on the AF-ON button 1 or the AF-ON button 2 by a finger or the like previously not in touch with the AF-ON button 1 or the AF-ON button 2. In other words, a start of a touch (hereinafter referred to as a touch-down).

A state where the AF-ON button 1 or the AF-ON button 2 is being touched by a finger or the like (hereinafter referred to as a touch-on).

A finger or the like moving while in touch with the AF-ON button 1 or the AF-ON button 2 (hereinafter referred to as a touch-move).

A state where a finger or the like previously in touch with the AF-ON button 1 or the AF-ON button 2 separates from the AF-ON button 1 or the AF-ON button 2. In other words, an end of a touch (hereinafter referred to as a touch-up).

A state where nothing is touching the AF-ON button 1 or the AF-ON button 2 (hereinafter referred to as a touch-off).

When a touch-down is detected, a touch-on is simultaneously detected. Normally, after a touch-down, a touch-on is continuously detected unless a touch-up is detected. A detection of a touch-move is also a state where a touch-on is detected. Even when a touch-on is detected, a touch-move is not detected when the movement amount (x,y) is 0. A touch-off occurs after a touch-up is detected for all of the fingers or the like previously in touch.

On the basis of the operations or states described above or a movement direction and a movement amount (x,y), the system control unit 50 determines what kind of operation (touch operation) has been performed on the AF-ON buttons 1 and 2. With respect to a touch-move, a movement in eight directions including upward, downward, leftward, rightward, upward left, downward left, upward right, and downward right directions or a two-dimensional direction constituted by the x-axis direction and the y-axis direction is detected as a movement of a finger or the like on the AF-ON buttons 1 and 2. The system control unit 50 determines that a slide operation has been performed when a movement in any of the eight directions or a movement in one of or both the x-axis direction and the y-axis direction of a two-dimensional directions is detected. In the present embodiment, the AF-ON buttons 1 and 2 are assumed to be infrared system touch sensors. Alternatively, touch sensors adopting other systems including a resistive film system, a surface acoustic wave system, a capacitance system, an electromagnetic induction system, an image recognition system, and an optical sensor system may be used as the AF-ON buttons 1 and 2.

A structure of the AF-ON button 1 will be described with reference to FIGS. 3A and 3B. Since a structure of the AF-ON button 2 is similar to that of the AF-ON button 1, a description thereof will be omitted.

A cover 310 is an external cover of the AF-ON button 1. A window 311 is a part of the external cover of the AF-ON button 1 and transmits light projected from a light projecting unit 312. The cover 310 protrudes further outward than an external cover 301 of the camera 100 and is depressible. The light projecting unit 312 is a light-emitting device such as a light-emitting diode which irradiates light directed toward the window 311. The light emitted from the light projecting unit 312 is desirably light (infrared light) which is not visible light. When a finger 300 is in touch with a surface of the window 311 (an operation surface of the AF-ON button 1), light irradiated from the light projecting unit 312 is reflected by a surface of the finger 300 which is in touch and reflected light is received (sensed) by a light receiving unit 313. The light receiving unit 313 is an image sensor. On the basis of an image sensed by the light receiving unit 313, a detection can be made as to whether or not a state exists where an operating body (the finger 300) is not in contact with the operation surface of the AF-ON button 1, whether or not the operating body has touched the AF-ON button 1, whether or not the touching operating body is moving while maintaining the touch (whether or not a slide operation is being performed), and the like. The cover 310 is installed on a contact surface 316 using an elastic member 314, and when the finger 300 pushes a surface of the window 311 and the cover 310 is depressed, the cover 310 comes into contact with a switch 315 for depression detection. Accordingly, a depression of the AF-ON button 1 is detected.

A face detection function will be described. The system control unit 50 sends an image of a face detection object to the image processing unit 24. Under the control of the system control unit 50, the image processing unit 24 applies a horizontal direction bandpass filter to the image data. In addition, under the control of the system control unit 50, the image processing unit 24 applies a vertical direction bandpass filter to the processed image data. Due to the horizontal and vertical direction bandpass filters, an edge component is detected from the image data.

Subsequently, the system control unit 50 performs pattern matching with respect to the detected edge component and extracts groups of candidates of eyes, noses, mouths, and ears. In addition, among the extracted group of eye candidates, the system control unit 50 determines candidates satisfying conditions set in advance (for example, a distance between two eyes or an inclination of two eyes) to be a pair of eyes and narrows down the extracted group of eye candidates to those including a pair of eyes. Furthermore, the system control unit 50 associates the narrowed-down group of eye candidates with other facial parts (a nose, a mouth, and ears) corresponding to the group of eye candidates and detects a face by applying a non-facial condition filter set in advance. The system control unit 50 outputs the face information described above in accordance with a result of the face detection and ends the process. At this point, a characteristic value such as the number of faces is stored in the system memory 52.

As described above, by performing an image analysis on an LV image or an image being reproduced and displayed, a characteristic value of the image can be extracted and object information can be detected (object detection for detecting a specific object can be performed). While a face has been described as an example of a specific object in the present embodiment, other objects such as a pupil, a hand, a torso, a specific individual, a dynamic body, and a character can be detected and selected as an object of AF and the like.

Figure 3A:
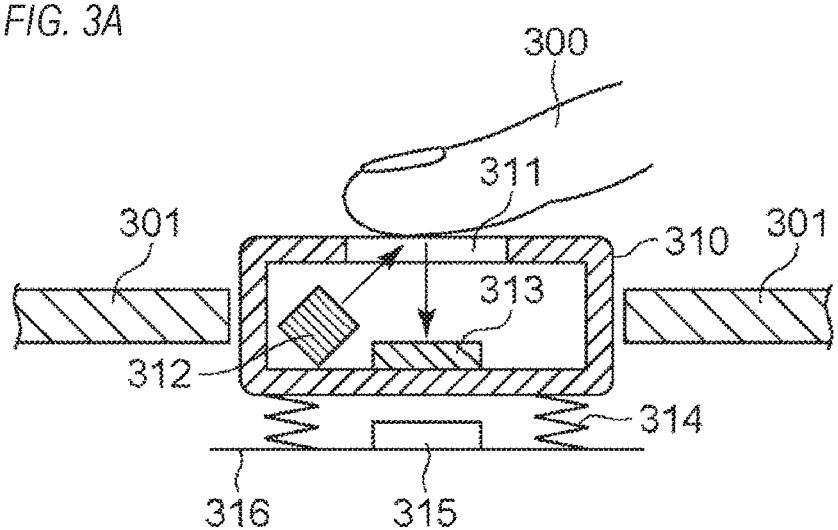
FIGS. 3A and 3B are diagrams representing a structure of an AF-ON button according to the present embodiment.
Figure 3B:
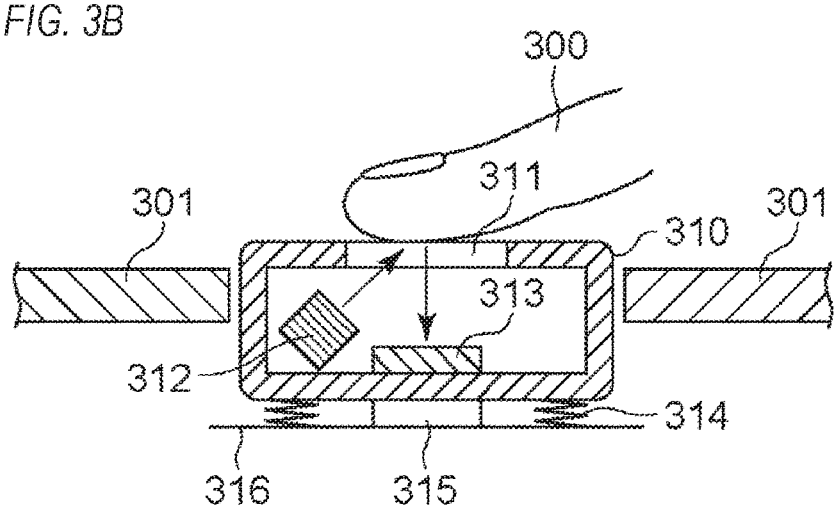

FIG. 3A is a schematic view of a state where the finger 300 has touched the operation surface of the AF-ON button 1 but has not depressed the AF-ON button 1. FIG. 3B is a schematic view of a state where the finger 300 has pressed the operation surface of the AF-ON button 1 to depress the AF-ON button 1 and the depression of the AF-ON button 1 is detected. By separating the finger 300 from the operation surface of the AF-ON button 1 in the depressed state shown in FIG. 3B, the AF-ON button 1 is restored by a force of the elastic member 314 to the state shown in FIG. 3A where the AF-ON button 1 is not in contact with the switch 315. While an example in which the elastic member 314 is installed on the contact surface 316 has been described, the elastic member 314 may be installed on the external cover 301 instead of the contact surface 316. In addition, the AF-ON button 1 is not limited to a button having the structure shown in FIGS. 3A and 3B and may have other structures as long as a depression of the operation surface and a touch operation on the operation surface can be detected.

AF frames that can be selected in the OVF mode will be described. In the OVF mode, as an AF frame selection mode (a ranging area selection mode), the user can select and set, in advance, any of a plurality of selection modes including at least the following selection modes from a setting menu.

Single-point AF (arbitrary selection): a selection mode in which the user selects a single ranging point (focus adjustment region) to be used in focusing (AF) from 191 ranging points. A focus adjustment region has a narrower range than in zone AF to be described later.

Zone AF (arbitrary zone selection): a selection mode in which a plurality of ranging points are classified into nine ranging zones (focus adjustment regions) and the user selects any of the ranging zones. Automatic selection AF is performed using all ranging points included in the selected zone. In automatic selection AF, AF is performed so that, among objects ranged at object ranging points, an object determined as an object to be automatically brought into focus comes into focus. Although AF is basically performed so that an object at a nearest distance comes into focus, conditions such as a position on a screen, an object size, and an object distance may also be taken into consideration. An object can be more readily captured than in single-point AF and, when photographing an object with movement, the object can be more readily brought into focus. In addition, since a zone to be brought into focus is narrowed down, a situation can be avoided where an object at an unintended position in a composition inadvertently comes into focus.

Automatic selection AF: a mode in which the automatic selection AF described above is performed using all ranging points. A ranging point to be used in AF is automatically determined from all ranging points without the user having to select an AF area.

Figure 4A:
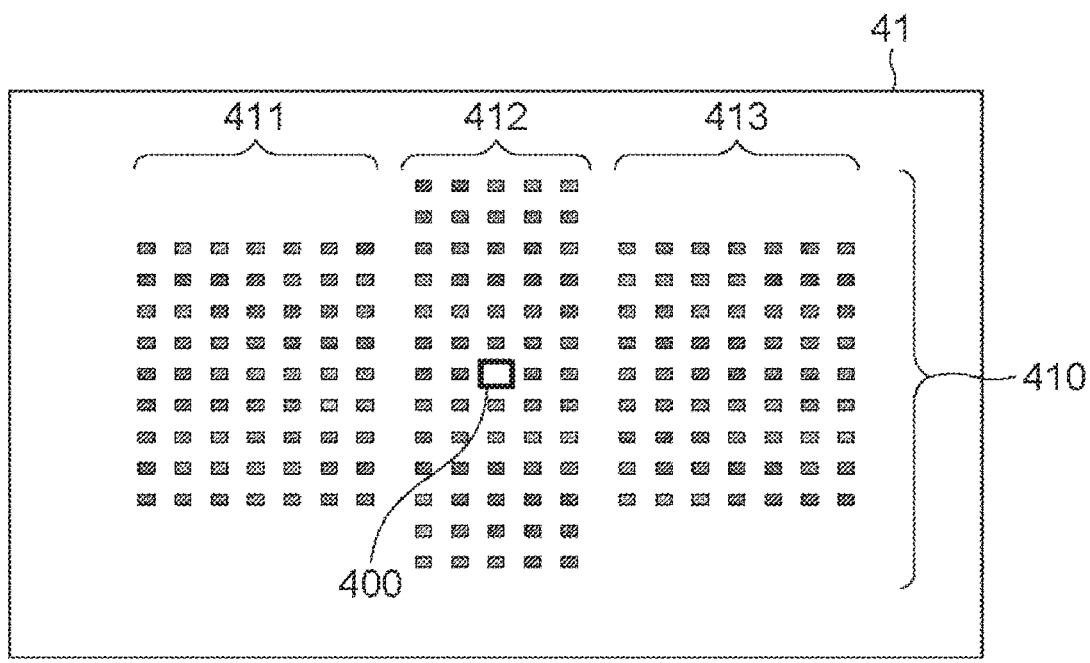
FIGS. 4A and 4B are diagrams showing ranging points according to the present embodiment.
Figure 4B:
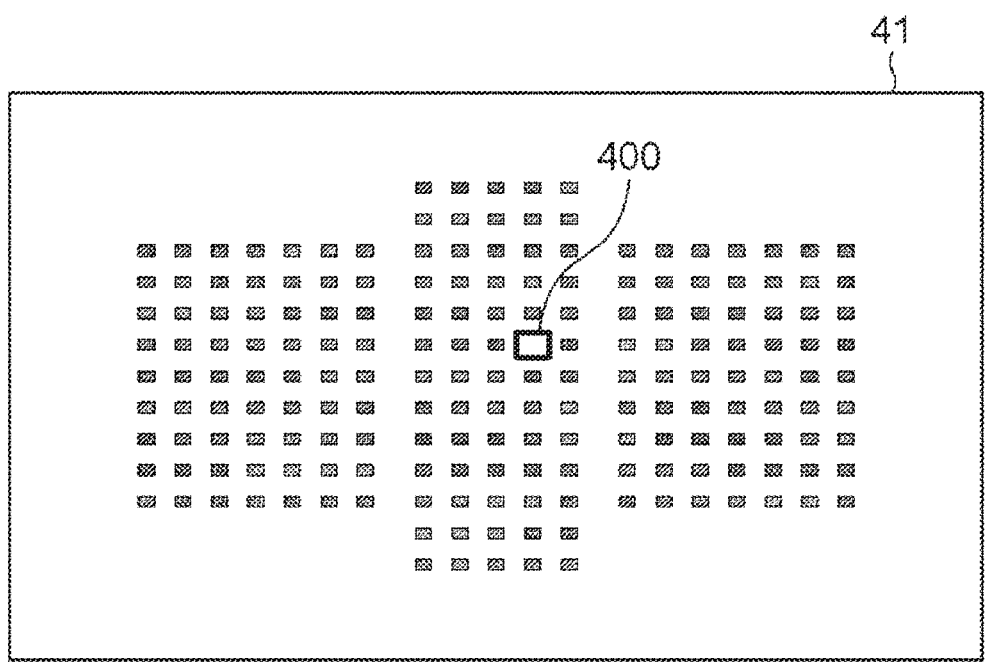

Ranging points that can be selected in single-point AF will be described with reference to FIGS. 4A and 4B. FIG. 4A is a display example of selectable ranging points and a selected ranging point on the finder internal display unit 41. The user can select any one ranging point among a ranging point group 410. The selected ranging point is displayed as an AF frame 400. The AF frame 400 is actually visible as being superimposed on an optical image of an object. Among the ranging point group 410, ranging points that are not selected may be configured not to be displayed. The focus detecting unit 11 is capable of performing focus detection and AF at a position corresponding to each position of the ranging points included in the ranging point group 410. The ranging point group 410 is classified into a left-side ranging point group 411, a central ranging point group 412, and a right-side ranging point group 413. 63 ranging points are respectively arranged in a 9-row, 7-column matrix in the left-side ranging point group 411 and the right-side ranging point group 413. 65 ranging points are arranged in a 13-row, 5-column matrix in the central ranging point group 412. In single-point AF, with the total of 191 ranging points included in the left-side ranging point group 411, the central ranging point group 412, and the right-side ranging point group 413 as selectable candidates, any one ranging point can be selected as an AF frame to be used in AF. FIG. 4A represents a display example in which a 7th-row, 3rd-column ranging point (a central ranging point) included in the central ranging point group 412 has been selected as the AF frame 400. FIG. 4B represents a display example in which a 6th-row, 4th-column ranging point (a central ranging point) included in the central ranging point group 412 has been selected as the AF frame 400. The state shown in FIG. 4B can be created by moving the AF frame 400 by one movement to the right (one unit of a selected position movement amount to be described later will be referred to as one movement) and one movement to above from the state shown in FIG. 4A. In addition, the state shown in FIG. 4B can also be created by moving the AF frame 400 by one movement to above right from the state shown in FIG. 4A.

Ranging zones that can be selected in zone AF will be described with reference to FIGS. 5A to 5I. Same elements as those in FIGS. 4A and 4B are shown using same reference numerals. In zone AF, one zone can be selected with the nine ranging zones respectively shown in FIGS. 5A to 5I as selectable candidates. FIG. 5A represents an example in which, among the ranging point group 410, a central ranging zone (a zone including a ranging point group constituted by 4th to 10th rows and 1st to 5th columns included in the central ranging point group 412) is selected to display a zone AF frame 500.

FIG. 5B represents an example in which, among the ranging point group 410, an upper ranging zone (a zone including a ranging point group constituted by 1st to 7th rows and 1st to 5th columns included in the central ranging point group 412) is selected by moving the zone AF frame 500 by one movement to above from the state shown in FIG. 5A. In a similar manner, FIG. 5C represents an example in which a lower ranging zone is selected by moving the zone AF frame 500 by one movement to below from the state shown in FIG. 5A. FIG. 5D represents an example in which a left ranging zone is selected by moving the zone AF frame 500 by one movement to the left from the state shown in FIG. 5A. FIG. 5E represents an example in which an upper left ranging zone is selected by moving the zone AF frame 500 by one movement to above left or by one movement to the left and one movement to above from the state shown in FIG. 5A. FIG. 5F represents an example in which a lower left ranging zone is selected by moving the zone AF frame 500 by one movement to below left or by one movement to the left and one movement to below from the state shown in FIG. 5A. FIG. 5G represents an example in which a right ranging zone is selected by moving the zone AF frame 500 by one movement to the right from the state shown in FIG. 5A. FIG. 5H represents an example in which an upper right ranging zone is selected by moving the zone AF frame 500 by one movement to above right or by one movement to the right and one movement to above from the state shown in FIG. 5A. FIG. 5I represents an example in which a lower right ranging zone is selected by moving the zone AF frame 500 by one movement to below right or by one movement to the right and one movement to below from the state shown in FIG. 5A.

AF frames that can be selected in the LV mode will be described. In the LV mode, as an AF frame selection mode (a ranging area selection mode, an AF system), the user can select and set, in advance, any of a plurality of selection modes including at least the following selection modes from a setting menu. It is assumed that the LV mode is also in effect in a photography standby state of a moving image (the moving image photography mode) and during recording of a moving image.

Face+tracking priority AF (face+tracking AF): a selection mode in which, when a face is detected from an LV image, the face is automatically tracked as an AF object and AF is performed, but when a face is not detected, an AF position is determined by automatic selection AF and AF is performed. When a plurality of faces are detected from an LV image, an AF frame (a face tracking frame) is initially displayed on a face determined by automatic selection, and a tracking object can be switched to a face on the right or the left by a left-right operation on the 8-way keys 74a and 74b or the AF-ON button. In addition, by touching the display unit 28, a face or an object other than a face can be selected as a tracking object to be tracked and brought into AF.

Live single-point AF (arbitrary selection): a selection mode in which the user selects a single ranging point to be used in focusing (AF) from 5655 ranging points arranged in 65 rows and 87 columns. With respect to the selected ranging point, focus detection and AF are performed by imaging surface phase difference AF or contrast AF.

Figure 6A:
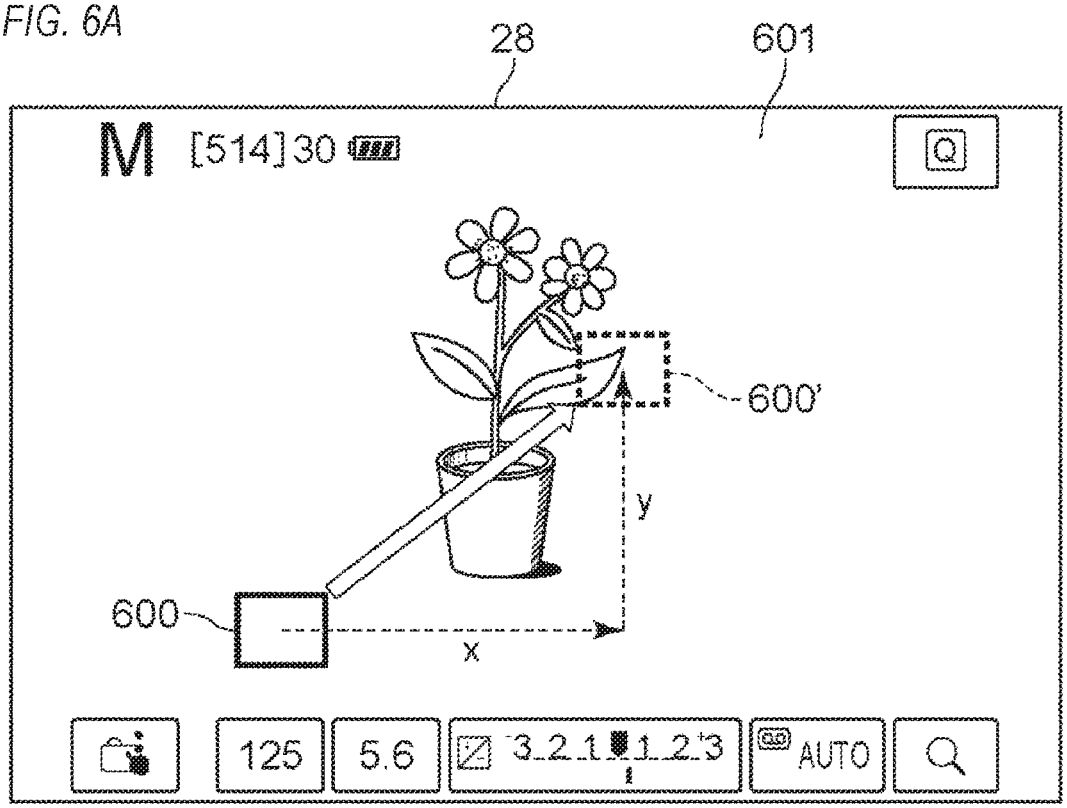
FIGS. 6A and 6B are diagrams showing movements of AF frames according to the present embodiment.

A movement of an AF frame in live single-point AF will be described with reference to FIG. 6A. FIG. 6A represents a display example on the display unit 28 in a case where live single-point AF is set in the LV mode. Various pieces of setting information, touch icons, and an AF frame 600 are displayed by being superimposed on an LV image 601. The AF frame 600 is an indicator which indicates a selected position on an LV image and which can be moved in accordance with a direction instruction operation using the 8-way keys 74a and 74b or a slide operation with respect to the AF-ON button. The AF frame 600 relatively moves from a position of the AF frame 600 prior to the movement by an amount obtained by multiplying an operation amount of each of x-direction and y-direction components of an operation with respect to these operation members by a designated coefficient to, for example, a position of an AF frame 600'.

Figure 6B:
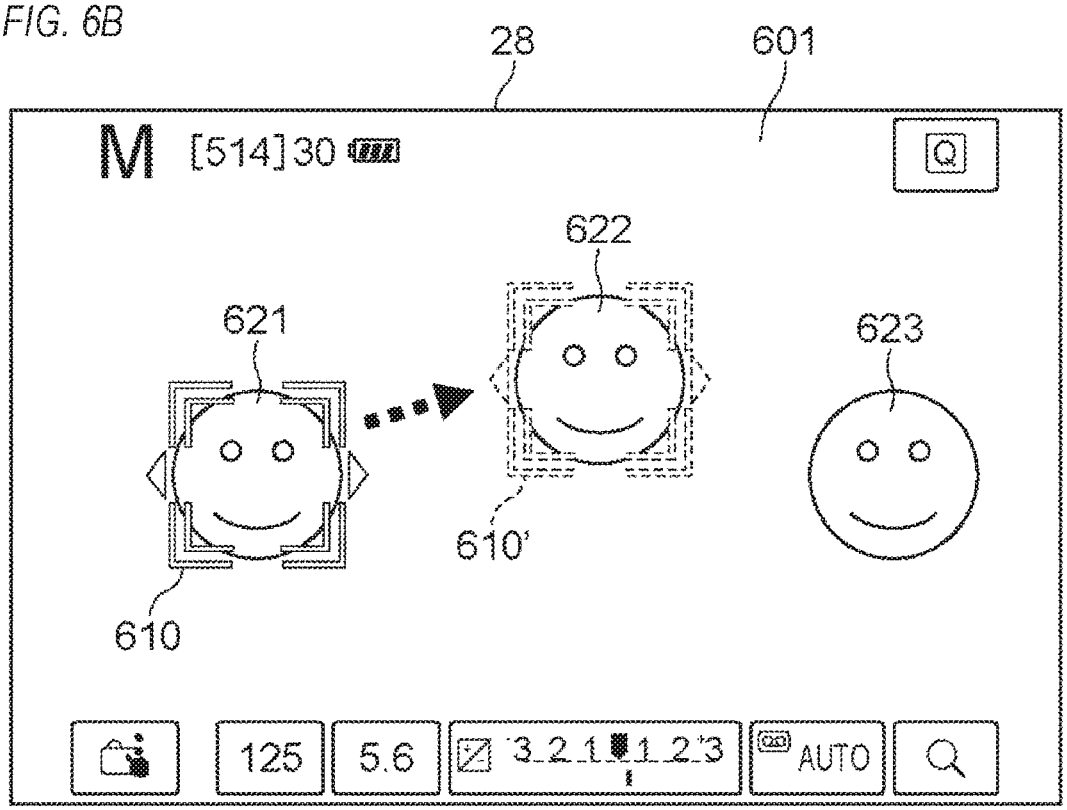

A movement of an AF frame in face+tracking AF will be described with reference to FIG. 6B. FIG. 6B represents a display example on the display unit 28 in a case where face+tracking AF is set in the LV mode and, at the same time, a plurality of faces are detected from an LV image and a single face is being tracked. Various pieces of setting information, touch icons, and an AF frame 610 (in this case, also a face frame, a tracking frame, or a face tracking frame) are displayed by being superimposed on the LV image 601. Three faces including a face 621, a face 622, and a face 623 are detected from the LV image 601 and, in the illustrated example, the face 621 is selected and tracked as an AF object. The AF frame 610 can be moved to another detected face in accordance with a direction instruction operation to the left or the right using the 8-way keys 74*a* and 74*b* or a leftward or rightward slide operation with respect to the AF-ON button. For example, in accordance with a movement instruction by a movement amount 1 (a minimum unit movement amount) by a rightward slide operation with respect to the AF-ON button, the AF frame can be moved to a face that is nearest to a face 621 currently being selected prior to selection change among faces to the right of the face 621 or, in other words, a face 622. Once the AF frame is moved to the face 622, the AF frame 610 is hidden and an AF frame 610' is displayed. At this point, the AF frame moves from the face 621 prior to selection change to the face 622 without passing through positions other than the faces. Details of a change in face selection by a leftward or rightward slide operation with respect to the AF-ON button for switching among selections will be provided later.

Figure 7:
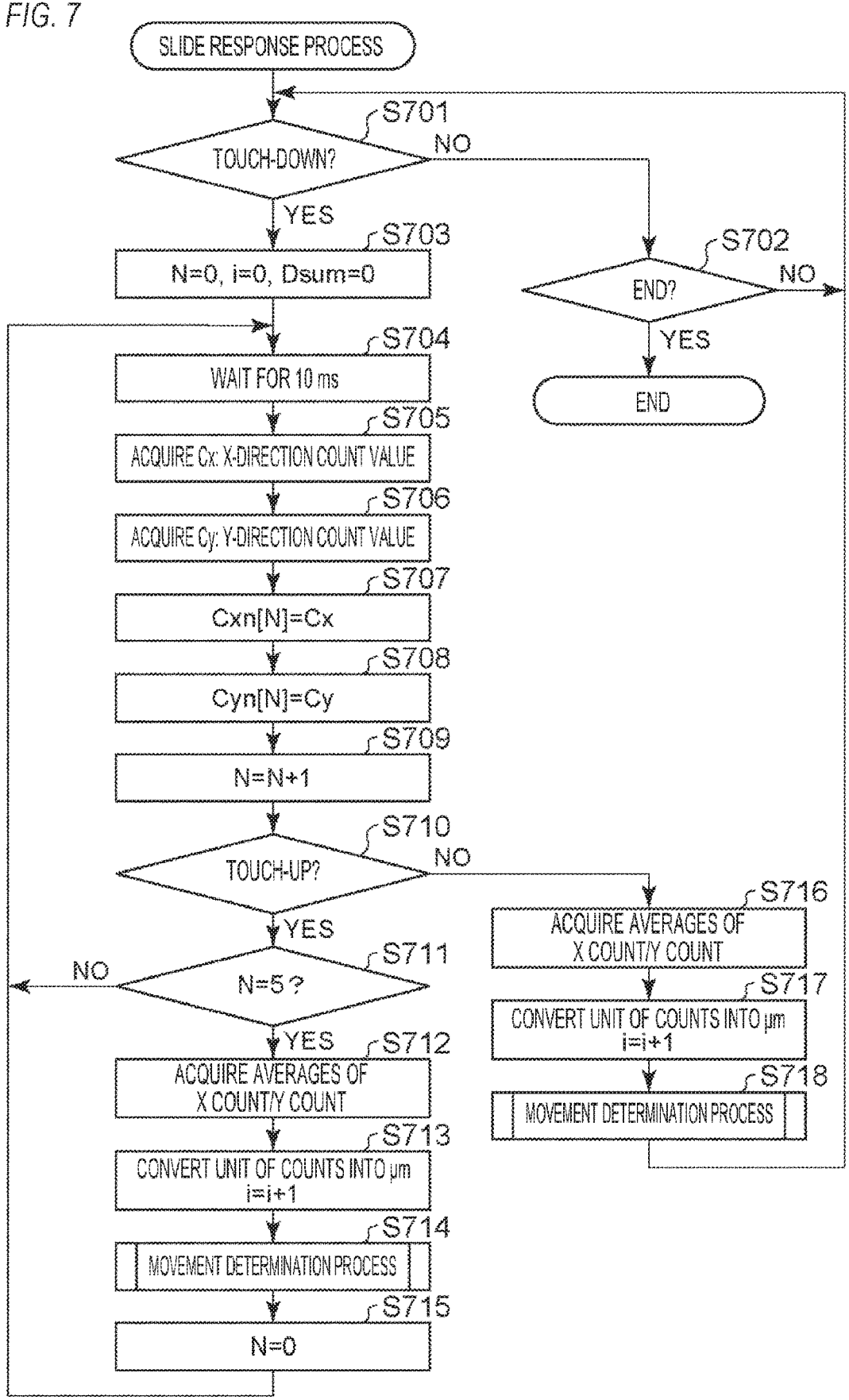
FIG. 7 is a flow chart of a slide response process according to the present embodiment.

FIG. 7 shows a flow chart of a slide response process with respect to the AF-ON button. The slide response process is an execution process of a function (for example, a movement of an AF frame) in accordance with a slide operation in which the operation surface is touched and a touch-move is performed without depressing the AF-ON button. This process is realized as the system control unit 50 deploys a program recorded in the nonvolatile memory 56 on the system memory 52 and executes the program. The process shown in FIG. 7 is started when the camera 100 is activated in the photography mode. While other processes (for example, processes in accordance with operations of other operation members included in the operating unit 70 and processes in accordance with a depression of the AF-ON button) are also performed in parallel when the camera 100 is activated in the photography mode, descriptions thereof will be omitted. In addition, while a response process to a slide operation with respect to the AF-ON button 1 will be described with reference to FIGS. 7, 8, 9A to 9C, 10A, and 10B, the AF-ON button 2 is to be processed in a similar manner. However, it is assumed that, when a touch-on with respect to the AF-ON button 1 is detected, a slide response process with respect to the AF-ON button 2 is not performed. Accordingly, a malfunction due to contention of operations with respect to the AF-ON button 1 and the AF-ON button 2 can be prevented (a slide operation with respect to the AF-ON button 1 is prioritized).

In S701, the system control unit 50 determines whether or not a touch-down with respect to the AF-ON button 1 has been performed. When a touch-down has been performed, the system control unit 50 advances to S703, but otherwise the system control unit 50 advances to S702. In the present embodiment, it is assumed that a process after a determination is made at this point that a touch-down has been performed is a process that is performed in a state where a depression of the AF-ON button 1 is not detected.

In S702, the system control unit 50 determines whether or not end conditions (for example, power turned off or a transition to the playback mode) of the slide response process have been satisfied. When the end conditions have been satisfied, the system control unit 50 ends the slide response process, but otherwise the system control unit 50 advances to S701 and repeats the process.

In S703, the system control unit 50 initializes various variables related to a slide operation. For example, the system control unit 50 initializes an internal variable N by 0. This N indicates the number of samplings and is used when averaging movement amounts. Every time N reaches 5, a movement amount (a touch-move amount, a slide amount) calculated by averaging movement amounts obtained from five samplings is acquired. In addition, in S703, the system control unit 50 initializes a variable i to 0. This i indicates the number of acquisitions of averaged movement amounts after a touch. In addition, the system control unit 50 initializes a variable Dsum to 0. Dsum is an integrated value in one or more acquisition periods (an acquisition period being 50 msec to be described later) of a movement distance (an operation amount) by one slide operation and is a two-dimensional coordinate value having directional components. As will be described later, Dsum is a variable that may be initialized even before a touch-up is performed (in other words, during a touch) (in other words, Dsum does not necessarily indicate a total integrated amount of movement distances of touches after a touch-down).

In S704, the system control unit 50 performs a Wait process prior to readout of a detected value of a movement amount from the AF-ON button 1. It is assumed that the Wait period is 10 msec (10 milliseconds).

In S705, the system control unit 50 acquires a detected value (a count value of which a unit is not distance) Cx of a movement amount in the X direction (the transverse direction) from the AF-ON button 1. In a similar manner, in S706, the system control unit 50 acquires a detected value (a count value of which a unit is not distance) Cy of a movement amount in the Y direction (the vertical direction) from the AF-ON button 1.

In S707, the system control unit 50 stores the count value Cx in the X direction acquired in S705 in an N-th Cxn [N] of an array Cxn. In S708, the system control unit 50 stores the count value Cy in the Y direction acquired in S706 in an N-th Cyn [N] of an array Cyn. In S709, the system control unit 50 increments the variable N that represents the number of samplings.

In S710, the system control unit 50 determines whether or not a touch-up from the AF-ON button 1 has been performed. When a touch-up from the AF-ON button 1 has been performed, the system control unit 50 advances to S716, but otherwise (when a touch with respect to the AF-ON button 1 is ongoing) the system control unit 50 advances to S711.

In S711, the system control unit 50 determines whether or not the variable N is 5 or, in other words, whether the number of samplings has reached 5. A case where N=5 is a time point at which 50 msec has elapsed after a touch-down is performed for an initial sampling and a time point at which 50 msec has elapsed after previously acquiring an averaged movement amount for subsequent samplings. In the present embodiment, N=5 is adopted on the basis of the Wait time in S704 being 10 msec and the fact that it is undesirable to delay a movement of an AF frame in response to a slide operation with respect to the AF-ON button 1 so as to be recognizable by the user or, in other words, it is undesirable to cause the user to sense that responsiveness is poor. In other words, an acquisition frequency of averaged distances is every 50 msec.

In S712, the system control unit 50 calculates an average value (Cxave) of count values from Cxn [0] to Cxn [N−1] and an average value (Cyave) of count values from Cyn [0] to Cyn [N−1].

In S713, the system control unit 50 converts the average count values Cxave and Cyave of 5 latest output values from the AF-On button 1 into distances Xave and Yave in units of micrometer (μm). Specifically, Cxave and Cyave are respectively multiplied by a designated coefficient to obtain Xave and Yave [μm]. By performing averaging and then converting the averages into distances, a situation is prevented where an effect of noise or the like causes a movement amount of an AF frame to be an extremely unnatural movement amount with respect to an actual movement amount of a finger. In addition, in S713, the system control unit 50 increments the variable i.

In S714, the system control unit 50 performs a movement determination process. The movement determination process will be described later with reference to FIG. 8.

In S715, the system control unit 50 initializes the variable N to 0, and subsequently advances to S704 to perform sampling for a next acquisition of an averaged movement amount.

In S716, the system control unit 50 performs a process similar to that performed in S712. A difference from S712 is that N is not necessarily 5. In S716, unlike in S712, variable N×10 msec which is an acquisition interval of averaged movement amounts may be shorter than 50 msec.

In S717, the system control unit 50 converts Cxave and Cyave into Xave and Yave [μm] and increments i in a similar manner to S713.

In S718, the system control unit 50 performs a movement determination process in a similar manner to S714. The movement determination process will be described later with reference to FIG. 8.

Figure 8:
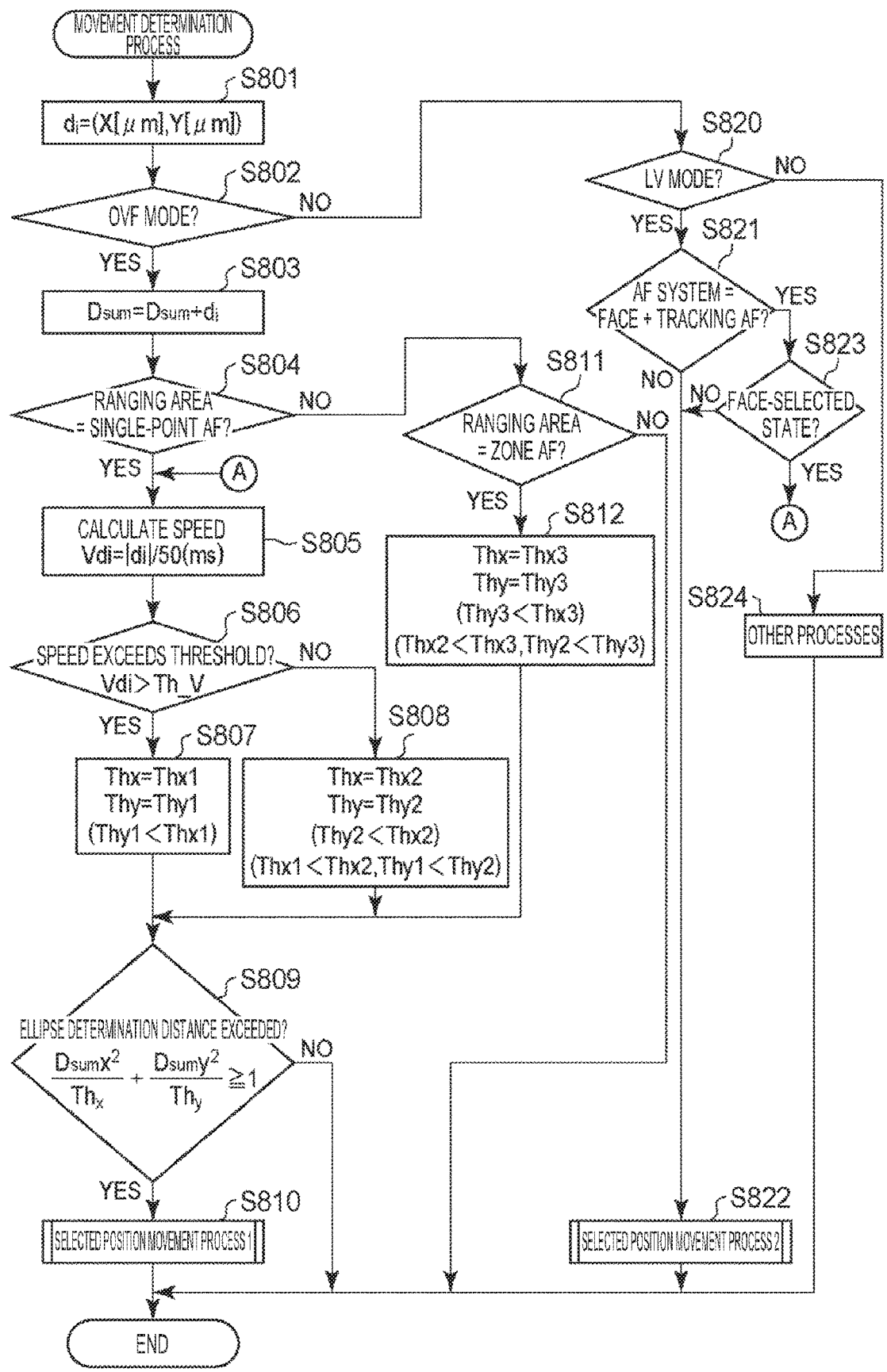
FIG. 8 is a flow chart of a movement determination process according to the present embodiment.

FIG. 8 is a flow chart of the movement determination process. This process represents details of the processes of S714 and S718 shown in FIG. 7 described earlier. In addition, this process is realized as the system control unit 50 deploys a program recorded in the nonvolatile memory 56 on the system memory 52 and executes the program.

In S801, the system control unit 50 substitutes (Xave, Yave) [μm] calculated in S713 or S717 shown in FIG. 7 described earlier into a variable di. The variable di represents a movement amount having directional components of a slide operation of a current acquisition (when a touch-up has not been performed, last 50 msec).

In S802, the system control unit 50 determines whether or not the present operating mode is the OVF mode. When the present operating mode is the OVF mode, the system control unit 50 advances to S803, but otherwise the system control unit 50 advances to S820.

In S803, the system control unit 50 adds the movement amount di substituted in S801 to an integrated value Dsum (a two-dimensional coordinate value having directional components) of movement amounts.

In S804, the system control unit 50 determines whether or not the ranging area selection mode is set to single-point AF. When the ranging area selection mode is set to single-point AF, the system control unit 50 advances to S805, but otherwise the system control unit 50 advances to S811.

In S805, the system control unit 50 calculates a movement speed (an operation speed) of the slide operation of the current acquisition (when a touch-up has not been performed, last 50 msec). Specifically, the system control unit 50 performs the calculation using movement speed Vdi=|di|/50 [msec], where |di|=√(Xave²+Yave²). It should be noted that, since |di| itself represents a movement amount per a certain time (50 msec), |di| is proportional to the movement speed. Therefore, instead of a division by time (50 msec), a comparison with a threshold used in S806 (to be described later) may be adopted as a comparison process between |di| and a threshold (a threshold for comparison with |di|).

In S806, the system control unit 50 determines whether or not the movement speed Vdi of the slide operation of the current acquisition exceeds a threshold TH_V. When the movement speed Vdi exceeds the threshold TH_V (when the movement speed Vdi is higher than the threshold TH_V), the system control unit 50 advances to S807, but otherwise (when the movement speed Vdi is equal to or lower than the threshold TH_V) the system control unit 50 advances to S808.

In S807, the system control unit 50 sets parameters related to an ellipse for determination to be described later in S809 as follows.

$$Thx=Thx1$$

$$Thy=Thy1$$

$$(Thy1<Thx1)$$

Thx1 and Thy1 are values recorded in the nonvolatile memory 56 in advance and satisfy a relationship expressed as Thx1>Thy1. The parameters are set so as to satisfy this relationship so that, as will be described later, in consideration of the fact that a movement of a finger in a vertical direction is more difficult to perform than a movement of the finger in a transverse direction, a movement of an AF frame can be started with a shorter movement amount in the vertical direction than in the transverse direction. While Thx and Thy are variables that differ depending on conditions, in any case, Thx is a value that defines a transverse width of the determination ellipse centered on an origin and Thy is a value that defines a vertical width of the determination ellipse centered on the origin. In the present embodiment, since Thx>Thy is satisfied in any case, transverse width of determination ellipse=major axis=2Thx and vertical width of determination ellipse=minor axis=2Thy.

In S808, the system control unit 50 sets parameters related to the determination ellipse to be described later in S809 as follows.

$$Thx=Thx2$$

$$Thy=Thy2$$

$$(Thy2<Thx2)$$

$$(Thx1<Thx2, Thy1<Thy2)$$

Thx2 and Thy2 are values recorded in the nonvolatile memory 56 in advance and satisfy a relationship of Thy2<Thx2. The parameters are set so as to satisfy this relationship so that, as will be described later, in consideration of the fact that a movement of a finger in a vertical direction is more difficult to perform than a movement of the finger in a transverse direction, a movement of an AF frame can be started with a shorter movement amount in the vertical direction than in the transverse direction.

In addition, relationships expressed as Thx1<Thx2 and Thy1<Thy2 are satisfied. In other words, an ellipse defined by (Thx2, Thy2) is larger than an ellipse defined by (Thx1, Thy1). Accordingly, a determination using the large ellipse defined by (Thx2, Thy2) requires a longer movement distance until an AF frame starts to move than a determination using the small ellipse defined by (Thx1, Thy1). In the present embodiment, since a determination using the large ellipse is performed when a movement speed of a finger is slow, a longer movement distance is intentionally required until a movement of an AF frame is started as compared to a case where the movement speed of the finger is fast. Accordingly, when the user is moving a finger slowly in order to move an AF frame in a careful manner, situations where a movement of the AF frame occurs with excessive frequency, a distance movement of the AF frame is excessively large, and the like can be prevented and a position of the AF frame can be finely adjusted. In other words, a reliable incremental movement (one movement amount at a time) is realized.

In S809, the system control unit 50 determines whether or not the integrated value Dsum of movement amounts (an integrated value Dsumx of Xave and an integrated value Dsumy of Yave) has reached an edge or the outside of the determination ellipse of feasibility of movement of an AF frame. The determination ellipse is an ellipse defined by expression 1 below.

$$D\mathrm{sum}x^2/Thx + D\mathrm{sum}y^2/Thy = 1 \qquad \text{Expression 1}$$

In other words, in S809, the system control unit 50 determines whether or not expression 2 below is satisfied.

$$D\mathrm{sum}x^2/Thx + D\mathrm{sum}y^2/Thy \geq 1 \qquad \text{Expression 2}$$

When it is determined that expression 2 is satisfied, the system control unit 50 advances to step S810. When expression 2 is not satisfied or, in other words, when the integrated value Dsum of movement amounts is inside the determination ellipse of feasibility of movement of an AF frame, the system control unit 50 ends the movement determination process without moving an AF frame (moving a selected position).

In S810, the system control unit 50 performs a selected position movement process 1 (a movement process of an AF frame). The selected position movement process 1 will be described later with reference to FIG. 10A.

According to the determination of S809, when the movement direction is directly transverse, the threshold of whether or not an AF frame is to be moved is Thx, and the AF frame is moved directly transverse (parallel to the operation direction) when a movement amount of a finger is equal to or larger than Thx but the AF frame is not moved when the movement amount of the finger is less than Thx. In addition, when the movement direction is directly above, the threshold of whether or not an AF frame is to be moved is Thy, and the AF frame is moved directly above (parallel to the operation direction) when the movement amount of the finger is equal to or larger than Thy but the AF frame is not moved when the movement amount of the finger is less than Thy.

In S811, the system control unit 50 determines whether or not the ranging area selection mode is set to zone AF. When the ranging area selection mode is set to zone AF, the system control unit 50 advances to S812, but otherwise (for example, when the ranging area selection mode is set to automatic selection AF) the system control unit 50 ends the movement determination process.

In S812, the system control unit 50 sets parameters related to the determination ellipse to be described later in S809 as follows.

$$Thx = Thx3$$

$$Thy = Thy3$$

$$(Thy3 < Thx3)$$

$$(Thx1 < Thx2 < Thx3, Thy1 < Thy2 < Thy3)$$

Thx3 and Thy3 are values recorded in the nonvolatile memory 56 in advance and satisfy a relationship of Thy3<Thx3. The parameters are set so as to satisfy this relationship so that, as will be described later, in consideration of the fact that a movement of a finger in a vertical direction is more difficult to perform than a movement of the finger in a transverse direction, a movement of an AF frame can be started with a shorter movement amount in the vertical direction than in the transverse direction.

In addition, relationships expressed as Thx1<Thx2<Thx3 and Thy1<Thy2<Thy3 are satisfied. In other words, an ellipse defined by (Thx3, Thy3) is larger than an ellipse defined by (Thx1, Thy1) and an ellipse defined by (Thx2, Thy2). Accordingly, a determination using a large ellipse defined by (Thx3, Thy3) requires an even longer movement distance until an AF frame starts to move than a determination using small ellipses defined by (Thx1, Thy1) and (Thx2, Thy2). In the present embodiment, since a determination using the large ellipse defined by (Thx3, Thy3) is performed when the ranging area selection mode is zone AF, a longer movement distance is required until a movement of an AF frame is started. The number (nine) of selectable positions (selectable zones) when zone AF is in effect is smaller than a case (191) where single-point AF is in effect. In addition, even when zone AF is moved from one end to the other, a movement amount is two movement amount units at a maximum (for example, when moving from a zone at a left end in FIG. 5D to a zone at a right end in FIG. 5G). Therefore, in zone AF, there is hardly any demand to swiftly move a selected position by a large distance. On the other hand, when a movement of the selected position occurs at an excessively high frequency with a short movement amount of a finger, an increased difficulty of the user when selecting a desired selected position (zone) becomes a major problem. In consideration thereof, in the present embodiment, by requiring an even longer movement distance until starting a movement of a selected position in a case where there are only a limited number of selectable positions such as zone AF, a fine adjustment of the selected position can be more readily performed. In other words, a reliable incremental movement (one movement amount at a time) is realized.

It should be noted that a movement amount (a movement distance) per a movement amount 1 (one movement) of an AF frame in zone AF differs according to the AF frame being selected and is not constant. For example, in a case of one movement to the left from the state shown in FIG. 5A, a movement of a distance corresponding to seven ranging points is performed on the finder internal display unit 41 as shown in FIG. 5D. On the other hand, in a case of one movement to above from the state shown in FIG. 5A, a movement of a distance corresponding to three ranging points is performed on the finder internal display unit 41 as shown in FIG. 5B. Therefore, a relationship between Thx2 and Thx3 and a relationship between a unit movement amount D2 (corresponding to one ranging point) in a case where Thx2 is used and a unit movement amount D3 (indefinite in zone AF) in a case where Thx3 is used are not proportional. In other words, Thx2:Thx3≠D2:D3. A similar description applies to Thy2:Thy3.

In S820, the system control unit 50 determines whether or not the present operating mode is the LV mode. When the present operating mode is the LV mode, the system control unit 50 advances to S821, but otherwise the system control unit 50 advances to S824.

In S821, the system control unit 50 determines whether or not the AF system (the AF frame selection mode) is set to face+tracking AF. When the AF system is set to face+tracking AF, the system control unit 50 advances to S823, but otherwise (for example, when the AF system is set to live single-point AF shown in FIG. 6A) the system control unit 50 advances to S822.

In S822, the system control unit 50 performs a selected position movement process 2 (a movement process of an AF frame). The selected position movement process 2 will be described later with reference to FIG. 10B.

In S823, the system control unit 50 determines whether or not a state where a face detected from an LV has been selected (for example, the state shown in FIG. 6B) is in effect. When the system control unit 50 determines that a state where a face has been selected is not in effect, the system control unit 50 advances to S822. When the system control unit 50 determines in S823 that a state where a face has been selected is in effect, the system control unit 50 advances to S805. However, in the processes of S805 to S810 in this case, the y component in di is ignored and the processes are performed using only the x component (a movement component in the left-right direction). When moving (changing) the selection of a face, there are cases where an immediately adjacent face is at a short distance (such as a group photo) as well as cases where an immediately adjacent face is at a long distance (as in the case shown in FIG. 6B). Therefore, adopting an algorithm for selecting a face at a distance proportional to a movement amount of a slide operation causes an operation amount of a slide operation for selecting an immediately adjacent face to change in accordance with a distance between the faces and prevents a steady sense of operation from being attained. In consideration thereof, in the present embodiment, in a state where a face is selected, the processes of S805 to S810 are performed in which the selected position is moved by one position every time the integrated value Dsum of operation amounts exceeds the determination ellipse. Accordingly, the operation amount of a slide operation for selecting an immediately adjacent face becomes more or less a constant amount regardless of a distance between the faces and the user's sense of operation can be improved. It should be noted that, even in this case, since a process of comparing an operation amount with a determination ellipse of which a size differs depending on a movement speed of a slide operation is performed, a fine adjustment in a slide operation that involves a slow movement can also be readily performed. However, this configuration is not restrictive and, in a state where a face is selected, a process may be performed which involves comparing an operation amount with a determination ellipse having a same size regardless of the movement speed of a slide operation.

In S824, the system control unit 50 performs a process in accordance with a slide operation with respect to the AF-ON button 1 in other operating modes. While a selection cursor movement operation on the menu screen or the like is an example of the process, a description thereof will be omitted in the present embodiment.

Figure 9A:
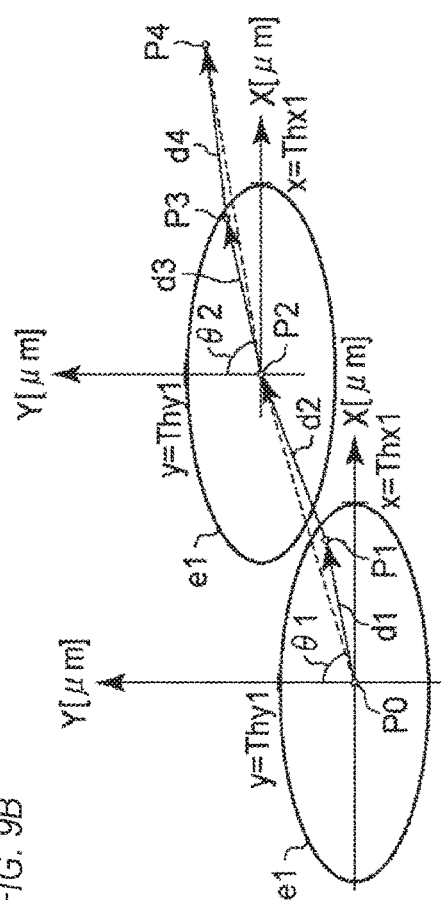
FIGS. 9A to 9C are diagrams showing operation examples of a camera according to the present embodiment.
Figure 9B:
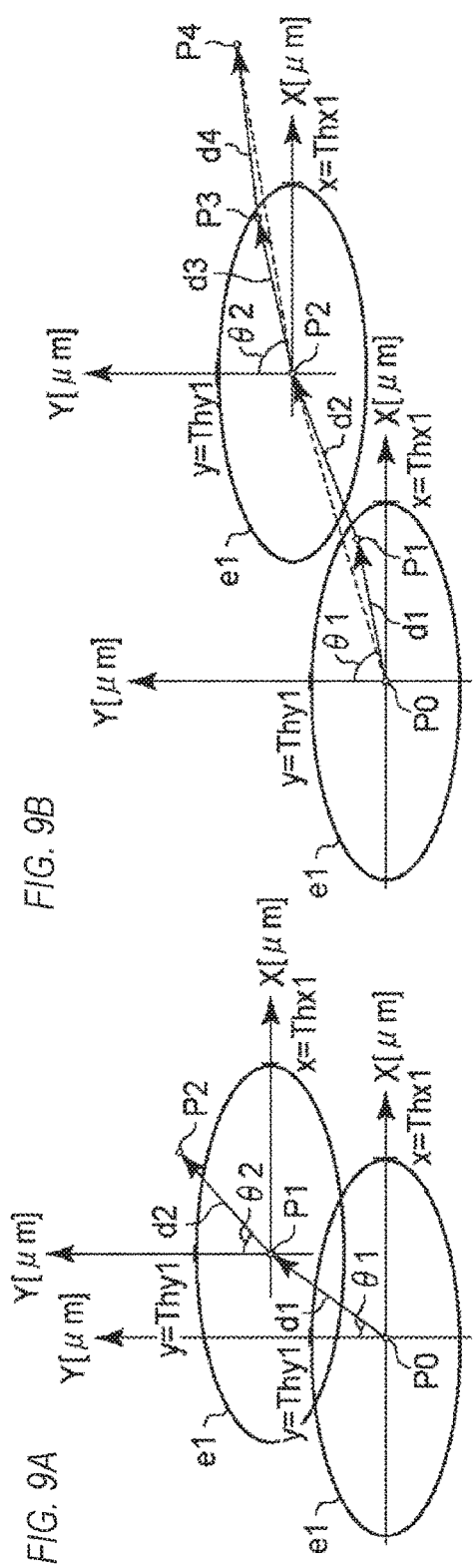
Figure 9C:
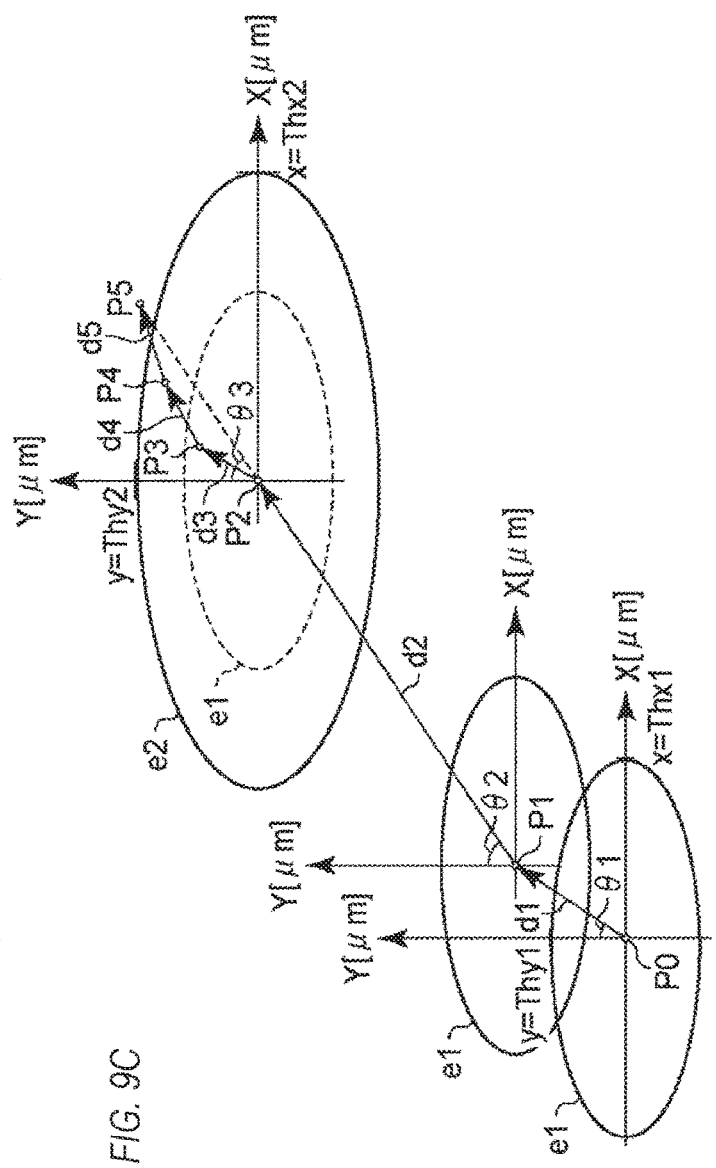

FIGS. 9A to 9C show an operation example in a case where one touch operation (an operation from a touch-down to a touch-up) with respect to the AF-ON button 1 or 2 is performed in single-point AF. It should be noted that each touch position described with reference to FIGS. 9A to 9C is a touch position on a virtual plane which is also a relative touch position on the basis of a movement amount of a finger detected by the AF-ON button 1 or 2 with a time point at which the detection of a touch had been started by the AF-ON button 1 or 2 as a position P0.

In FIG. 9A, a slide operation (movement speed>threshold TH_V) from the position P0 to a position P2 is performed. Before 50 msec elapses from the start of the operation, the touch position moves from the position P0 to a position P1 by a movement amount d1 and exits a determination ellipse e1 centered on the position P0. Therefore, at a time point where 50 msec elapses, the selected position movement process 1 is performed and an AF frame moves by a movement amount 1 in a direction determined by an angle θ1. Although details will be provided later, at this point, due to the selected position movement process 1, the integrated value Dsum of the movement amount di is reset to 0 and a center position of the determination ellipse is reset to the position P1 (the integrated value Dsum and a coordinate system of the determination ellipse are reset).

In a similar manner, in FIG. 9A, during a 50-msec period from the time point where 50 msec elapses to a time point where 100 msec elapses, the touch position moves from the position P1 to the position P2 by a movement amount d2 and exits the determination ellipse e1 centered on the position P1. Therefore, even at the time point where 100 msec elapses, the AF frame moves by the movement amount 1 in a direction determined by an angle θ2. Even at this point, the integrated value Dsum is reset to 0 and a center position of the determination ellipse is reset to the position P2 (the integrated value Dsum and a coordinate system of the determination ellipse are reset).

In FIG. 9B, a slide operation (movement speed>threshold TH_V) from the position P0 to a position P4 is performed. Before 50 msec elapses from the start of the operation, the touch position moves from the position P0 to the position P1 by the movement amount d1. Although the movement amount d in FIG. 9B is equal to the movement amount d1 in FIG. 9A, a movement direction of a touch position by the movement amount d1 in FIG. 9B differs from that in FIG. 9A and the touch position P1 at the time point where 50 msec elapses is inside the determination ellipse e1. Therefore, at the time point where 50 msec elapses, the selected position movement process 1 is not performed and the AF frame is not moved. In this manner, since whether or not an AF frame is to be moved is determined using an ellipse, even if the movement amount di of a touch position is the same, the AF frame may or may not move depending on the movement direction of the touch position. In addition, even when a slide of a same slide distance is performed by one slide operation (in other words, a slide operation with a duration of 100 msec or longer) across a plurality of acquisition periods (each acquisition period being 50 msec) of a movement amount of a touch position, a movement amount of an AF frame differs depending on the movement direction of the touch position. For example, when a rightward slide operation with an operation amount (a total movement distance of a touch position by one touch operation) of a distance M is performed parallel to the X axis, a position of the AF frame moves rightward by a first movement amount (for example, 3). On the other hand, when an upward slide operation is performed parallel to the Y axis by a same operation amount as the distance M described above, a position of the AF frame moves upward by a second movement amount (for example, 5) that is larger than the first movement amount.

In addition, in FIG. 9B, during a 50-msec period from the time point where 50 msec elapses to the time point where 100 msec elapses, the touch position moves from the position P1 to the position P2 by a movement amount d2 and exits the determination ellipse e1 centered on the position P0. Therefore, at the time point where 100 msec elapses, the selected position movement process 1 is performed for the first time and an AF frame moves by the movement amount 1. The movement direction of the AF frame is determined by the angle θ1 formed between a line segment (a dashed line in the diagram) which connects the position P0 to the position P2 and which indicates the integrated value Dsum obtained by integrating the movement amounts d1 and d2 and the Y axis. At this point, the integrated value Dsum is reset to 0 and a center position of the determination ellipse is reset to the position P2 (the integrated value Dsum and a coordinate system of the determination ellipse are reset).

In a similar manner, in FIG. 9B, while the touch position moves from the position P2 to the position P3 by a movement amount d3 before 150 msec elapses, since the touch position does not exit the determination ellipse e1 centered on the position P2, the AF frame is not moved at a time point where 150 msec elapses. In addition, since the touch position moves from the position P3 to the position P4 by a movement amount d4 and exits the determination ellipse e1 centered on the position P2 before 200 msec elapses, the AF frame moves by the movement amount 1 at a time point where 200 msec elapses. The movement direction of the AF frame is determined by an angle θ2 formed between a line segment (a dashed line in the diagram) which connects the position P2 to the position P4 and which indicates the integrated value Dsum obtained by integrating the movement amounts d3 and d4 and the Y axis. At this point, the integrated value Dsum is reset to 0 and a center position of the determination ellipse is reset to the position P4 (the integrated value Dsum and a coordinate system of the determination ellipse are reset).

In FIG. 9C, a slide operation from the position P0 to a position P5 is performed. Before 50 msec elapses from the start of the operation, the touch position moves from the position P0 to the position P1 by the movement amount d1 and at a movement speed that is higher than the threshold TH_V In a similar manner, during a 50-msec period from the time point where 50 msec elapses to the time point where 100 msec elapses, the touch position moves from the position P1 to the position P2 by the movement amount d2 and at a movement speed that is higher than the threshold TH_V. Therefore, at the time point where 50 msec elapses and the time point where 100 msec elapses, whether or not an AF frame is to be moved is determined using the determination ellipse e1 expressed by Thx=Thx1 and Thy=Thy1 and the AF frame is respectively moved by the movement amount 1 in a similar manner to FIGS. 9A and 9B.

Subsequently, since the touch position moves at a lower movement speed than the threshold TH_V, whether or not an AF frame is to be moved is determined using the determination ellipse e2 expressed by Thx=Thx2 and Thy=Thy2. Specifically, during a period from the time point where 100 msec elapses to a time point where 150 msec elapses, since the touch position moves from the position P2 to the position P3 by the movement amount d3 but does not exit the determination ellipse e2 centered on the position P2, the AF frame is not moved at the time point where 150 msec elapses. In a similar manner, during a 50-msec period from the time point where 150 msec elapses to a time point where 200 msec elapses, since the touch position moves from the position P3 to the position P4 by the movement amount d4 but does not exit the determination ellipse e2 centered on the position P2, the AF frame is not moved at the time point where 200 msec elapses. In addition, during a 50-msec period from the time point where 200 msec elapses to a time point where 250 msec elapses, the touch position moves from the position P4 to a position P5 by a movement amount d5 and exits the determination ellipse e2 centered on the position P2. Therefore, at the time point where 250 msec elapses, the selected position movement process 1 is performed and the AF frame moves by the movement amount 1. The movement direction of the AF frame is determined by an angle θ3 formed between a line segment (a dashed line in the diagram) which connects the position P2 to the position P5 and which indicates the integrated value Dsum obtained by integrating the movement amounts d3 to d5 and the Y axis. At this point, the integrated value Dsum is reset to 0 and a center position of the determination ellipse is reset to the position P5 (the integrated value Dsum and a coordinate system of the determination ellipse are reset).

When the determination ellipse e1 is to be used always, since the touch position (the position P4) exits the determination ellipse e1 centered on the position P2, the AF frame moves at the time point where 200 msec elapses. In the present embodiment, such a movement is prevented from occurring by using the determination ellipse e2 that is larger than the determination ellipse e1 when the movement speed is low. Accordingly, responsiveness of a movement of the AF frame is intentionally lowered to enable a fine adjustment of the AF frame to be readily performed.

In FIG. 9C, the movement amount d2 causes the touch position to exit the determination ellipse e1 by a wide margin (a distance from the position P1 to the position P2 is equal to or more than twice a distance from the position P1 to an edge of the determination ellipse e1). However, a movement amount of the AF frame at a timing of the position P2 is the movement amount 1. In this manner, a movement amount of one movement of the AF frame due to the selected position movement process 1 is fixed regardless of how much a finger moves during one acquisition period (50 msec) of the movement amount di (regardless of a movement amount of the finger after exceeding the determination ellipse). In other words, the movement amount of the finger and the movement amount of the AF frame do not have a proportional relationship. Therefore, methods of use such as moving the AF frame by one ranging point for each quick slide operation such as a slide operation that is completed within one acquisition period (50 msec) of the movement amount di (for example, three quick slide operations in rapid succession causing the AF frame to move by three ranging points) can now be employed. As a result, the AF frame can be moved by one ranging point at a time in a quick and reliable manner. The AF frame can even be moved by one ranging point at a time by a user who prefers to slide a finger by the number of times corresponding to an amount by which the user desires to move the AF frame.

On the other hand, the AF frame can be continuously moved by a large distance by a single slide operation across two or more acquisition periods (100 msec or more) of the movement amount di. By performing a long slide operation at a certain speed, the AF frame can be moved by one ranging point every 50 msec and the AF frame can be moved by a large distance by a single slide operation.

It should be noted that per-speed thresholds such as those shown in FIG. 9C may be set using shapes other than ellipses. For example, a threshold may be set using circles of sizes that differ among different movement speeds so that a same threshold is used regardless of the movement direction of a slide operation.

It should be noted that, even when in a state where a face is selected in face+tracking AF, whether or not an AF frame is to be moved is determined using the determination ellipse e1 or the determination ellipse e2 in a similar manner to single-point AF. In the case of zone AF, whether or not an AF frame is to be moved is determined using the determination ellipse that is expressed by Thx=Thx3 and Thy=Thy3. In the case of zone AF, determination ellipses are not switched in accordance with different movement speeds.

Figure 10A:
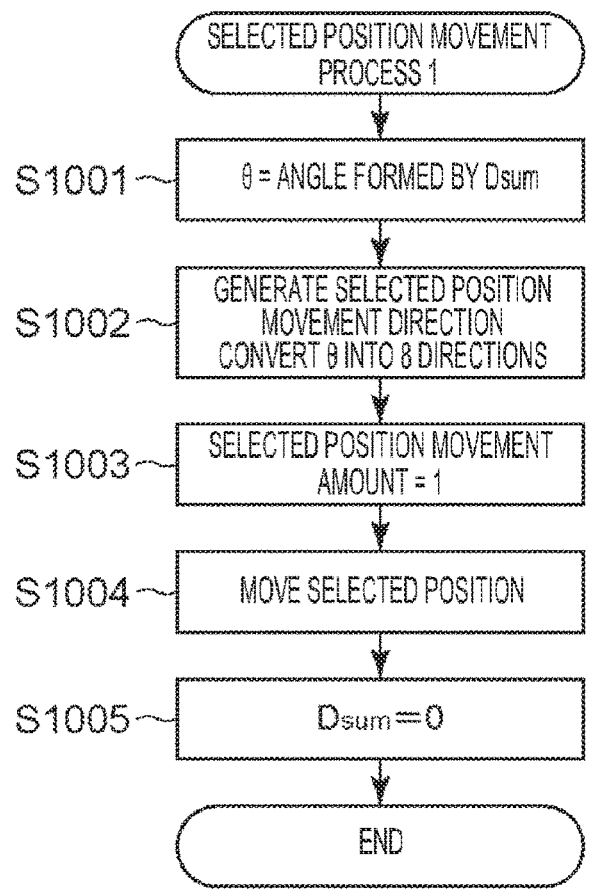
FIGS. 10A and 10B are flow charts of selected position movement processes according to the present embodiment.

FIG. 10A shows a flow chart of the selected position movement process 1. This process represents details of the process of S810 shown in FIG. 8 described earlier. In addition, this process is realized as the system control unit 50 deploys a program recorded in the nonvolatile memory 56 on the system memory 52 and executes the program.

In S1001, the system control unit 50 calculates an angle $\theta$ formed by vector directions of the integrated value Dsum (a two-dimensional coordinate value having directional components) of movement amounts. In the case of FIG. 9A, at the time point where 50 msec elapses from the start of the operation, with the movement amount d1 as the integrated value Dsum, an angle $\theta 1$ formed by the integrated value Dsum (an angle of a direction from the position P0 toward the position P1 with respect to the Y direction (the vertical direction)) is calculated and the integrated value Dsum is reset to 0. In addition, at the time point where 100 msec elapses, with the movement amount d2 as the integrated value Dsum, an angle $\theta 2$ formed by the integrated value Dsum is calculated. In the case of FIG. 9B, the selected position movement process 1 is not performed at the time point where 50 msec elapses and, at the time point where 100 msec elapses, with a sum (a dashed line) of the movement amount d1 and the movement amount d2 as the integrated value Dsum, the angle $\theta 1$ formed by the integrated value Dsum is calculated and the integrated value Dsum is reset to 0. In addition, the selected position movement process 1 is not performed at the time point where 150 msec elapses and, at the time point where 200 msec elapses, with a sum (a dashed line) of the movement amount d3 and the movement amount d4 as the integrated value Dsum, the angle $\theta 2$ formed by the integrated value Dsum is calculated. In the case of FIG. 9C, similarly, the angle $\theta 1$, the angle $\theta 2$, and an angle $\theta 3$ are calculated at the time point where 50 msec elapses, at the time point where 100 msec elapses, and at the time point where 250 msec elapses.

In S1002, the system control unit 50 determines a movement direction of an AF frame (a selected position) on the basis of the angle $\theta$ calculated in S1001. In the present embodiment, the angle $\theta$ is converted into any of eight directions of upward, downward, leftward, rightward, upward left, downward left, upward right, and downward right as described below. It should be noted that the number and orientations of candidates of the movement direction are not particularly limited.

$-22.5° (337.5°) < \theta \leq 22.5°$ . . . movement direction: upward $22.5° < \theta \leq 67.5°$ . . . movement direction: upward right $67.5° < \theta \leq 112.5°$ . . . movement direction: rightward $112.5° < \theta \leq 157.5°$ . . . movement direction: downward right $157.5° < \theta \leq 202.5°$ . . . movement direction: downward $202.5° < \theta \leq 247.5°$ . . . movement direction: downward left $247.5° < \theta \leq 292.5°$ . . . movement direction: leftward $292.5° < \theta \leq 337.5°$ . . . movement direction: upward left In S1003, the system control unit 50 sets a fixed value 1 as the movement amount of the AF frame. It should be noted that the movement amount of the AF frame need not be 1 and the user may be enabled to designate (set) other movement amounts.

In S1004, the system control unit 50 moves the AF frame in the movement direction (any of the eight directions of upward, downward, leftward, rightward, upward left, downward left, upward right, and downward right) determined in S1002 by the movement amount 1 set in S1003. For example, when the AF frame is moved upward right by the movement amount 1 from the state shown in FIG. 4A, the state shown in FIG. 4B is created. It should be noted that, when the AF frame is at an end of a row or a column constituting a ranging point group, the AF frame does not move in a direction that causes the AF frame to exceed the end (the AF frame abuts against the end).

In S1005, the system control unit 50 resets the integrated value Dsum of movement amounts to 0.

Figure 10B:
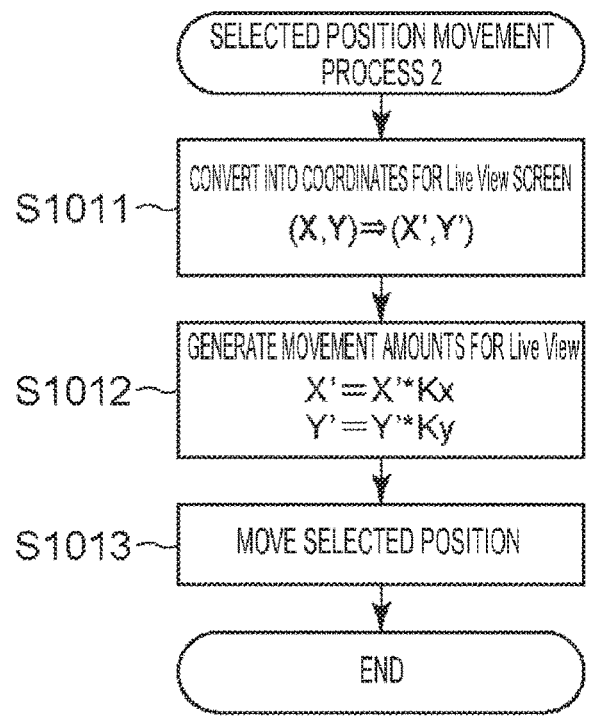

FIG. 10B shows a flow chart of the selected position movement process 2. This process represents details of the process of S822 shown in FIG. 8 described earlier. In addition, this process is realized as the system control unit 50 deploys a program recorded in the nonvolatile memory 56 on the system memory 52 and executes the program.

In S1011, the system control unit 50 converts the movement amount di or, in other words, a movement amount (X=Xave, Y=Yave) [μm] into a relative movement amount (X', Y') of a coordinate system of a live view image (an LV image) while taking an aspect ratio and a size of the live view image into consideration.

In S1012, the system control unit 50 determines the movement amount of the AF frame by multiplying the movement amount (X', Y') of the AF frame by a coefficient value. Specifically, a final value X' is determined by multiplying the value X' obtained in S1011 by a coefficient Kx, and a final value Y' is determined by multiplying the value Y' obtained in S1011 by a coefficient Ky. It should be noted that when a coefficient value of 1 is adopted, the process of S1012 need not be performed, and the coefficient values Kx and Ky may be any value as long as the value is a real number value.

In S1013, the system control unit 50 relatively moves the AF frame by the movement amount (X', Y') determined in S1012. An upward-right slide operation causes a movement of the AF frame (a movement of the selected position) such as that performed with reference to FIG. 6A to be performed.

In the selected position movement process 2, even when the movement distance of a slide operation does not exceed the threshold of the ellipse described in S809 in FIG. 8, a movement of the AF frame (a movement of the selected position) is performed in proportion to the movement distance of the slide operation. For example, in the LV mode, when the AF frame selection mode (designation mode) is live single-point AF (arbitrary selection) which is independent of whether or not a face has been detected, the selected position movement process 2 is performed in accordance with a slide operation. Therefore, in live single-point AF (arbitrary selection), when a rightward slide operation is performed in parallel to the X axis, a movement of the AF frame (a movement of the selected position) is performed even if the integrated value of the movement distances of the slide operation does not exceed a determination threshold of an ellipse (since the slide operation is parallel to the X axis, the distance Thx1). On the other hand, in the LV mode, when the AF frame selection mode (designation mode) is face+tracking priority AF in which a face detected from an LV image is selected, a determination of Yes is made in S823 if a face has been detected and selected and the system control unit 50 advances to S805. In addition, after performing the processes of S805 to S808, when it is determined in S809 that the determination threshold of the ellipse has been exceeded, the selected position movement process 1 in accordance with a slide operation is performed. Therefore, in face+tracking priority AF, when a rightward slide operation is performed in parallel to the X axis, a movement of the AF frame is not performed unless the integrated value of the movement distances exceeds the determination threshold of the ellipse (since the slide operation is parallel to the X axis, Thx1 or Thx2), but once the determination threshold of an ellipse is exceeded, the AF frame is moved. In other words, an object (a face) that is the selection object is changed. It should be noted that a process similar to the face+tracking priority AF described above may be performed in an AF frame selection mode in which an object (for example, a pupil) of another type that is detectable in the LV mode can be selected. In other words, when it is determined in S809 that the determination threshold of the ellipse has been exceeded, the selected position movement process 1 in accordance with a slide operation may be performed.

An example of a problem in slide operations of an AF-ON button and an example of an effect of using an ellipse in determinations according to the present embodiment (staring a movement of an AF frame with a smaller movement amount in the vertical direction than in a transverse direction) will be described with reference to FIGS. 11A to 11E.

FIG. 11A shows a situation where the user grasps the first grip portion 101 by the right hand 1100, holds the camera 100 at a lateral position, and operates the AF-ON button 1. FIG. 11B shows a situation where the user grasps the second grip portion 102 by the right hand 1100, holds the camera 100 at a vertical position, and operates the AF-ON button 2. FIG. 11C shows a situation where the user grasps the first grip portion 101 by the right hand 1100, holds the camera 100 at a vertical position, and operates the AF-ON button 1. In any of FIGS. 11A to 11C, the user is to operate the AF-ON button with the thumb 1101 of the right hand 1100.

FIG. 11D shows a situation where a transverse slide operation (a slide operation in the transverse direction, specifically, a rightward slide operation) with respect to the AF-ON button is performed. A state 1141 represents a start state of the transverse slide operation, a state 1142 represents a state during the transverse slide operation, and a state 1143 represents an end state of the transverse slide operation. As represented by the states 1141 to 1143, a transverse slide operation is an operation as though drawing an arc with respect to a base of a finger joint as the center of the arc. A transverse slide operation is relatively easy to perform (for example, contact pressure or a contact portion to the AF-ON button can be readily maintained), and a large movement amount of the thumb 1101 is readily detected in a transverse slide operation. In particular, in the case of a device that determines a movement of a finger on the basis of a difference between image patterns of the finger such as an OTP, during the transverse slide operation in which contact pressure or a contact portion to the AF-ON button can be readily maintained, characteristic values of a fingerprint of a person is more readily detected in a stable manner and the transverse slide operation is readily detected.

FIG. 11E shows a situation where a vertical slide operation (a slide operation in the vertical direction, specifically, an upward slide operation) with respect to the AF-ON button is performed. In FIG. 11E, upper drawings are schematic views in a case where the AF-ON button is viewed from a rear surface side (a front surface side with respect to the operating surface of the AF-ON button), and lower drawings are schematic views in a case where the AF-ON button is viewed from a side surface side. A state 1151 represents a start state of the vertical slide operation, a state 1152 represents a state during the vertical slide operation, and a state 1153 represents an end state of the vertical slide operation. As represented by the states 1151 to 1153, a vertical slide operation is an operation involving bending and stretching a finger joint. A vertical slide operation is relatively difficult to perform (for example, contact pressure or a contact portion to the AF-ON button is difficult to maintain), and a large movement amount of the thumb 1101 is difficult to detect in a transverse slide operation. In particular, in the case of a device that determines a movement of a finger on the basis of a difference between image patterns of the finger such as an OTP, during the vertical slide operation in which contact pressure or a contact portion to the AF-ON button is difficult to maintain, it is difficult to detect characteristic values of a fingerprint of a person in a stable manner and to detect the transverse slide operation. In FIG. 11E, a vertical slide operation starts as a portion of the thumb 1101 near the fingertip comes into contact with the AF-ON button (a side view of the state 1151). In addition, the vertical slide operation ends as a contact portion to the AF-ON button changes so as to distance itself from the fingertip of the thumb 1101 (side views of states 1152 and 1153).

Therefore, when a movement amount (a movement amount of a finger; a threshold) for starting a movement of an AF frame is set the same for a transverse slide operation and a vertical slide operation, the AF frame is less readily moved by the vertical slide operation and imparts a sense to the user that it is difficult to perform the vertical slide operation.

In consideration thereof, in the present embodiment, as described in S809, an ellipse that is long in the transverse direction is used as a threshold so that a movement of an AF frame starts by a smaller movement amount in the vertical direction as compared to the transverse direction and the AF frame can be moved by a same amount by a smaller movement amount of a finger in the vertical direction than in the transverse direction. For example, while movements of the AF frame by a same movement amount 2 are performed in FIGS. 9A and 9B, the AF frame moves by two ranging points with a smaller movement amount (a movement distance of a finger) in FIG. 9A which has a larger vertical component of the movement amount. Accordingly, the user can perform slide operations in various directions with a similar sense of operation. It should be noted that a movement of an AF frame need only be started by a smaller movement amount in the vertical direction than in the transverse direction and the present invention is not limited to a determination using an ellipse as is the case with the present embodiment.

The electronic device according to the present invention is not limited to an electronic device mounted with an AF-ON button and the present invention can be applied to any apparatus as long as the apparatus detects a movement of an operating body (a finger or a stylus) and moves an indicator (a selected position). For example, the present invention can be applied to a case where, in accordance with a slide operation by a finger (an operating body) touching a touch pad of a notebook PC, an indicator such as a pointing cursor or an item selection cursor displayed on a display of the notebook PC is relatively moved. In addition, the present invention can also be applied to a case where, in an imaging apparatus, in accordance with a slide operation by a touch operation of a finger (an operating body) with respect to a touch panel-system rear surface display, an indicator that indicates a ranging point selected position displayed in an optical finder or an electronic finder is moved. The present invention is not limited to touch operations and can also be applied to a case where an indicator is relatively moved in accordance with an operation with respect to a joystick being a member that instructs a distance when being tilted, a rotating dial, and the like. The present invention can also be applied to devices such as a wearable device to which only a small number of operation members can be mounted. Furthermore, the present invention can also be applied to devices that detect a motion of a hand (an operating body) of a user such as a spatial gesture in a contactless manner and moves an indicator displayed on a projector or the like in accordance with the motion.

It should be noted that the various controls described above as controls to be performed by the system control unit 50 may be carried out by one piece of hardware or a plurality of pieces of hardware (for example, a plurality of processors or circuits) may control an entire apparatus by sharing processes.

In addition, while the present invention has been described in detail on the basis of a preferred embodiment thereof, it is to be understood that the present invention is not limited to the specific embodiment and various modes that do not constitute departures from the scope of the invention are also included in the present invention. Furthermore, the embodiment described above simply represents an example of the present invention and the embodiment can also be combined with other embodiments.

Moreover, while an example in which the present invention is applied to an imaging apparatus has been described in the embodiment presented above, the present invention is not limited to this example and can be applied to any electronic device which is capable of detecting a movement operation. For example, the present invention can be applied to a personal computer, a PDA, a mobile phone terminal, a mobile image viewer, a printer apparatus, a digital photo frame, a music player, a game device, an electronic book reader, and the like. The present invention can also be applied to a video player, a display apparatus (including a projection apparatus), a tablet terminal, a smartphone, an AI speaker, a domestic electrical appliance, a vehicle-mounted apparatus, and the like.

According to the present disclosure, suitable control in accordance with a movement operation can now be performed in consideration of an operation speed of the movement operation. In addition, a movement operation in accordance with an object to be selected as a selected position and with a better sense of operation can be performed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-085967, filed on Apr. 26, 2019, and Japanese Patent Application No. 2019-085716, filed on Apr. 26, 2019, which are hereby incorporated by reference herein in their entirety.

What is claimed is:

1. An electronic device comprising at least one memory and at least one processor which function as:
   a detecting unit configured to detect a movement operation involving a movement of an operating body; and
   a control unit configured to perform control such that
   in a first case a first operating mode is set, wherein in the first operating mode, an indicator that indicates a selected position for a predetermined function is displayed on a first display that is viewed via a finder for confirming an object image to be photographed,
   if a movement amount of the operating body in the movement operation does not exceed a first threshold, the selected position for the predetermined function is not moved,
   the selected position for the predetermined function is moved in accordance with the movement amount of the movement operation exceeding the first threshold, and
   in a second case a second operating mode is set, wherein in the second operating mode, the indicator that indicates the selected position is displayed together with a live view image on a second display outside of the finder,
   the selected position for the predetermined function is moved in accordance with the movement operation even when the movement amount of the movement operation does not exceed the first threshold.

2. The electronic device according to claim 1, wherein
in the first case, the movement amount of the movement operation and a movement distance of the selected position are not proportional to each other, and
in the second case, the movement amount of the movement operation and the movement distance of the selected position are proportional to each other.

3. The electronic device according to claim 1, wherein the control unit performs control such that, in the first case, the selected position is moved in a case where an integrated value during one or more acquisition periods of the movement amount in one operation exceeds the first threshold.

4. The electronic device according to claim 3, wherein the control unit performs control such that, in the first case, the selected position is moved by a predetermined movement amount in a case where an integrated value during one or more acquisition periods of the movement amount in one operation exceeds the first threshold, regardless of an amount exceeding the first threshold among the integrated value up to an acquisition period including a time point at which the first threshold had been exceeded.

5. The electronic device according to claim 4, wherein the predetermined movement amount is a movement amount of a minimum unit.

6. The electronic device according to claim 4, wherein the predetermined movement amount is a movement amount designated by a user in advance prior to the movement operation.

7. The electronic device according to claim 1, wherein the detecting unit detects an operation in which the operating body moves in a state where the operating body is in touch with an operation surface.

8. The electronic device according to claim 1, wherein the detecting unit detects a movement operation with respect to an operation surface of an operation member which is arranged at a position that is operatable by a thumb of a hand grasping a grip portion for holding the electronic device.

9. The electronic device according to claim 8, wherein the operation member is an operation member to which a depressing operation that differs from the movement operation is also possible.

10. The electronic device according to claim 1, further comprising
an image sensor.

11. The electronic device according to claim 10, further comprising
a shutter button for performing an instruction to photography by the image sensor and an operation member, wherein
the detecting unit detects the movement operation with respect to an operation surface of the operation member, and
the operation member is arranged at a position where the movement operation is possible with respect to the operation surface by a thumb of a right hand in a case where the electronic device is held by the right hand in a state where the shutter button is depressible by an index finger of the right hand.

12. The electronic device according to claim 1, wherein the selected position is a position of an item to be selected among a plurality of items displayed on a display.

13. A control method of an electronic device, comprising:
detecting a movement operation involving a movement of an operating body; and
performing control such that
in a first case a first operating mode is set, wherein in the first operating mode, an indicator that indicates a selected position for a predetermined function is displayed on a first display that is viewed via a finder for confirming an object image to be photographed,
if a movement amount of the operating body in the movement operation does not exceed a first threshold, the selected position for the predetermined function is not moved,
the selected position for the predetermined function is moved in accordance with the movement amount of the movement operation exceeding the first threshold, and
in a second case a second operating mode is set, wherein in the second operating mode, the indicator that indicates the selected position is displayed together with a live view image on a second display outside of the finder,
the selected position for the predetermined function is moved in accordance with the movement operation even when the movement amount of the movement operation does not exceed the first threshold.

14. A non-transitory computer readable medium that stores a program, wherein the program causes a computer to execute a control method of an electronic device, the control method comprising:
detecting a movement operation involving a movement of an operating body; and
performing control such that
in a first case a first operating mode is set, wherein in the first operating mode, an indicator that indicates a selected position for a predetermined function is displayed on a first display that is viewed via a finder for confirming an object image to be photographed,
if a movement amount of the operating body in the movement operation does not exceed a first threshold, the selected position for the predetermined function is not moved,
the selected position for the predetermined function is moved in accordance with the movement amount of the movement operation exceeding the first threshold, and
in a second case a second operating mode is set, wherein in the second operating mode, the indicator that indicates the selected position is displayed together with a live view image on a second display outside of the finder,
the selected position for the predetermined function is moved in accordance with the movement operation even when the movement amount of the movement operation does not exceed the first threshold.

* * * * *